(12) United States Patent
Gotou

(10) Patent No.: US 7,550,999 B2
(45) Date of Patent: Jun. 23, 2009

(54) RECEIVER CAPABLE OF INCREASING OPERATION SPEED WITH SUPPRESSING INCREASE OF POWER CONSUMPTION

(75) Inventor: Masashi Gotou, Tsuruoka (JP)

(73) Assignee: NEC Electronics Corporation, Kanagawa (JP)

( * ) Notice: Subject to any disclaimer, the term of this patent is extended or adjusted under 35 U.S.C. 154(b) by 344 days.

(21) Appl. No.: 11/503,285

(22) Filed: Aug. 14, 2006

(65) Prior Publication Data
US 2007/0036242 A1 Feb. 15, 2007

(30) Foreign Application Priority Data
Aug. 15, 2005 (JP) ............................. 2005-235382

(51) Int. Cl.
*H03K 19/094* (2006.01)
(52) U.S. Cl. .......................................... 326/83; 326/87
(58) Field of Classification Search .................. 326/82, 326/83, 86, 87; 327/108, 109, 333
See application file for complete search history.

(56) References Cited

U.S. PATENT DOCUMENTS 6,445,210 B2 * 9/2002 Nojiri ........................... 326/68

6,456,111 B1 * 9/2002 Yamaguchi ................... 326/86
7,199,638 B2 * 4/2007 Dubey et al. ................. 327/333

FOREIGN PATENT DOCUMENTS

| JP | 6-291562 | 10/1994 |
| JP | 2000-357961 | 12/2000 |
| JP | 2001-053598 | 2/2001 |
| JP | 2002-135339 | 5/2002 |

OTHER PUBLICATIONS

Chinese Patent Office issued a Chinese Office Action dated Nov. 20, 2008, Application No. 200610110858.9 with English Translation.

* cited by examiner

*Primary Examiner*—James Cho
(74) *Attorney, Agent, or Firm*—Young & Thompson

(57) ABSTRACT

A receiver is constructed by a signal reception circuit including a first amplifier section adapted to generate a first current in response to a first input signal and a second amplifier section adapted to generate a second current in response to a second input signal, to thereby generate an amplification signal in accordance with a difference between the first and second currents, and a feedback signal generating circuit adapted to generate a feedback signal in accordance with the amplification signal. Driving abilities of the first and second amplifier sections are determined in accordance with the feedback signal.

20 Claims, 18 Drawing Sheets

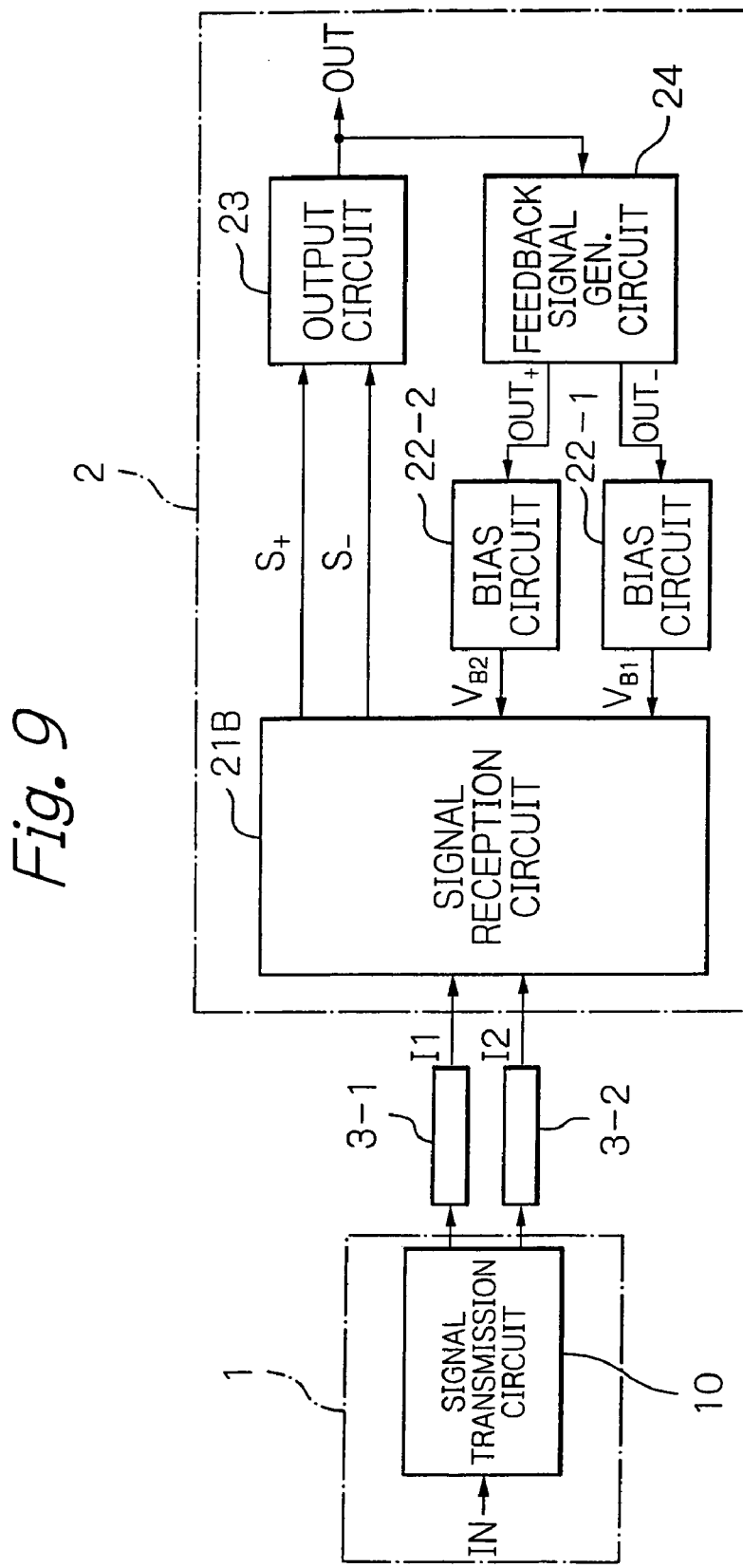

RECEIVER CAPABLE OF INCREASING OPERATION SPEED WITH SUPPRESSING INCREASE OF POWER CONSUMPTION

BACKGROUND OF THE INVENTION

1. Field of the Invention

The present invention relates to a data transmission system including a transmitter-side integrated circuit unit, a receiver-side integrated circuit unit, and transmission lines connected therebetween, and more particularly, to a receiver of the receiver-side integrated circuit unit.

2. Description of the Related Art

Generally, in a computer system, low voltage differential signaling (LVDS) data transmission systems have been used (see: JP-2001-357961 A, JP-2001-53598 A & JP-2002-135339 A).

A prior art data transmission system is constructed by a transmitter-side integrated circuit unit, a receiver-side integrated circuit unit, and first and second transmission lines connected therebetween (see: FIGS. 1 and 6 of JP-2001-53598 A). The transmitter-side integrated circuit unit is formed by a signal transmission circuit for transmitting an input signal generated in the transmitter-side internal circuit to the first and second transmission lines. On the other hand, a receiver of the receiver-side integrated circuit unit is formed by a signal reception circuit connected to the first and second transmission lines, a bias circuit for supplying a bias voltage to the signal reception circuit, and an output circuit for generating an output signal and transmitting it to the receiver-side internal circuit.

The signal transmission circuit is constructed by first and second inverters connected in series for receiving the input signal, an n-channel MOS transistor connected between the first transmission line and the ground terminal and whose gate is controlled by the output signal of the first inverter, and an n-channel MOS transistor connected between the second transmission line and the ground terminal and whose gate is controlled by the output signal of the second inverter.

When the input signal is at a high level, the first transmission line is in a high impedance (HZ) state and the second transmission line is at 0V. On the other hand, when the input signal is at a low level, the first transmission line is at 0V and the second transmission line is in an HZ state.

Thus, the signal transmission circuit generates LVDS signals in accordance with the input signal and transmits them to the first and second transmission lines, respectively.

On the other hand, in the receiver of the receiver-side integrated circuit unit, the signal reception circuit is constructed by a non-inverted amplification signal generating circuit connected to the first and second transmission lines for differentially amplifying the signals at the second and first transmission lines to generate a non-inverted amplification signal, an inverted amplification signal generating circuit connected to the first and second transmission lines for differentially amplifying the signals at the first and second transmission lines to generate an inverted amplification signal, and a constant current source circuit connected to the first and second transmission lines.

The elements of the non-inverted amplification signal generating circuit are symmetrical to those of the inverted amplification signal generating circuit.

The non-inverted amplification signal generating circuit is formed by first and second n-channel MOS transistors serving as amplifiers, and p-channel MOS transistors serving as a first current mirror circuit connected to the first and second n-channel MOS transistors. The bias voltage is applied to the gates of the first and second n-channel MOS transistors.

The inverted amplification signal generating circuit is formed by third and fourth n-channel MOS transistors serving as amplifiers and third and fourth p-channel MOS transistors as a second current mirror circuit connected to the third and fourth n-channel MOS transistors. The bias voltage is applied to the gates of the third and fourth n-channel MOS transistors.

The above-described prior art data transmission system will be explained later in detail.

SUMMARY OF THE INVENTION

In the above-described receiver of the receiver-side integrated circuit unit, however, since the amplifiers each formed by one n-channel MOS transistor generally have very small driving ability, the receiver of the receiver-side integrated circuit unit cannot be operated at a high speed.

In order to increase the operation speed of the receiver of the receiver-side integrated circuit unit, the driving ability of the amplifiers each formed by one n-channel MOS transistor can be increased to increase currents flowing therethrough. In this case, however, the power consumption is increased. Note that in a steady state of data transmission without clock signals, even when the signals at the first and second transmission lines are not changed, since two of the n-channel MOS transistors are always deeply turned ON, the total currents flowing through the amplifiers each formed by one n-channel MOS transistor are increased. Thus, there is a trade-off relationship between the operation speed and the power consumption.

According to the present invention, a receiver is constructed by a signal reception circuit including a first amplifier section adapted to generate a first current in response to a first input signal and a second amplifier section adapted to generate a second current in response to a second input signal, to thereby generate an amplification signal in accordance with a difference between the first and second currents, and a feedback signal generating circuit adapted to generate a feedback signal in accordance with said amplification signal. Driving abilities of the first and second amplifier sections are determined in accordance with the feedback signal.

BRIEF DESCRIPTION OF THE DRAWINGS

The present invention will be more clearly understood from the description set forth below, as compared with the prior art, with reference to the accompanying drawings, wherein:

FIG. 9 is a block circuit diagram illustrating a data transmission system including a second embodiment of the receiver according to the present invention;

DESCRIPTION OF THE PREFERRED EMBODIMENTS

Figure 1:
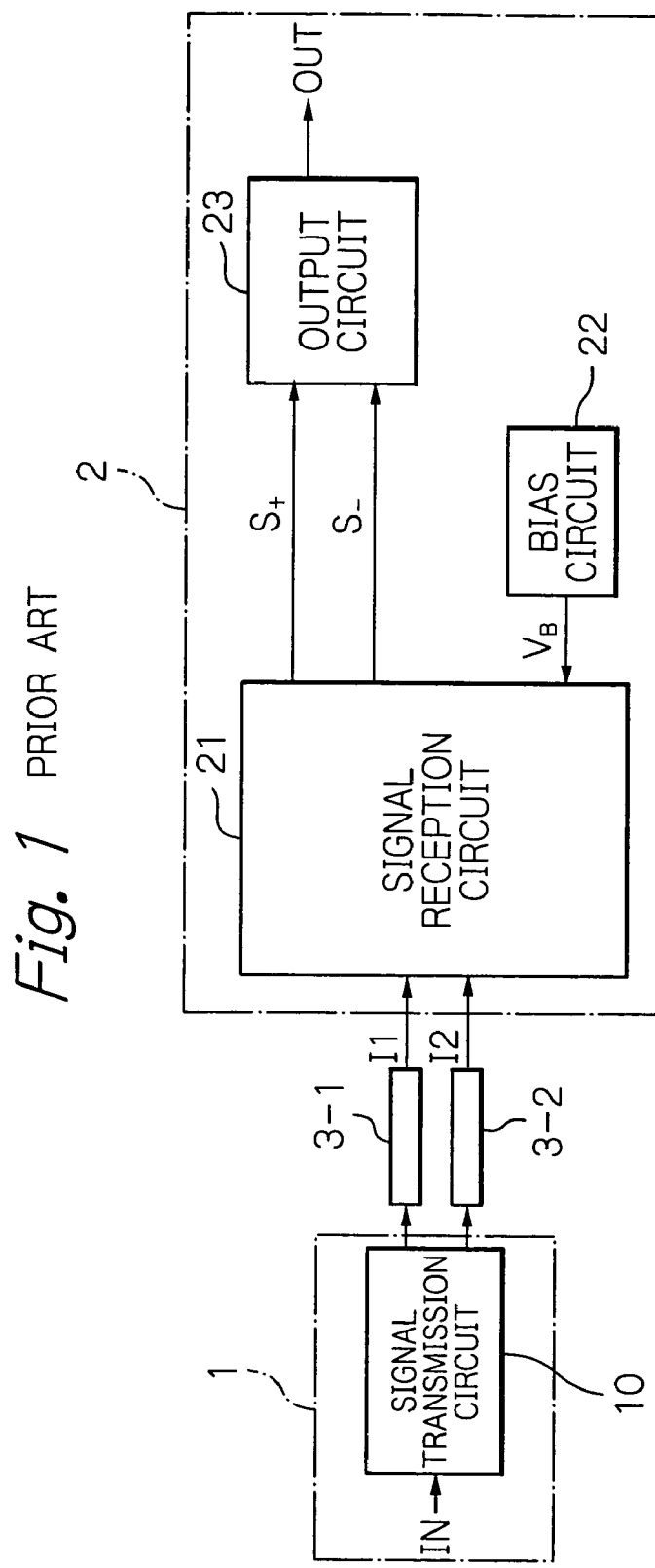
FIG. 1 is a block circuit diagram illustrating a prior art data transmission system.
Figure 6:
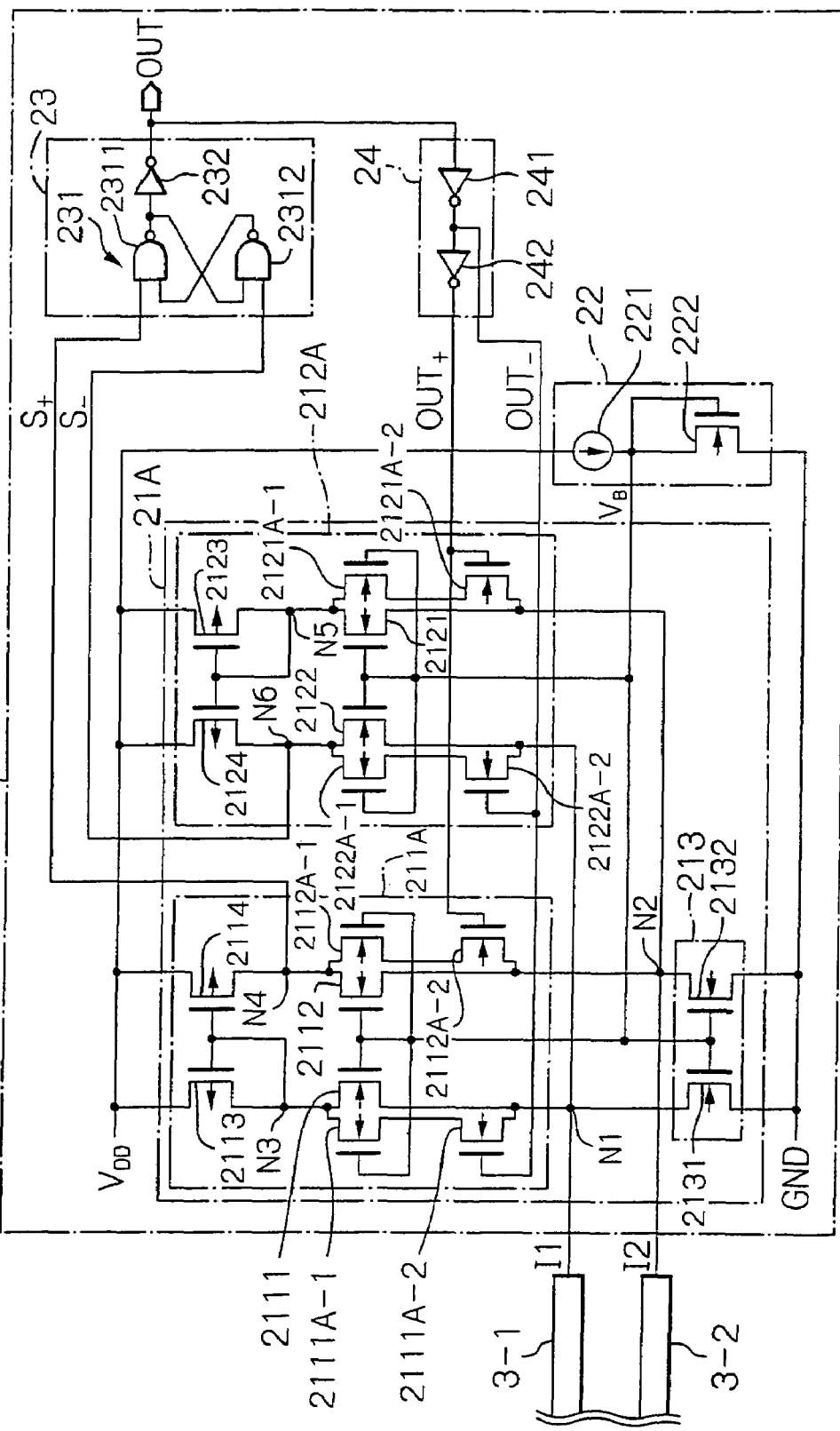
FIG. 6 is a detailed circuit diagram of the receiver, i.e., the signal reception circuit, the bias circuit, the output circuit, the feedback signal generating circuit of FIG. 5.

Before the description of the preferred embodiments, a prior art data transmission system will be explained with reference to FIGS. 1, 2 and 3 (see: FIGS. 1 and 6 of JP-2001-53598 A).

In FIG. 1, which illustrates a prior art data transmission system, this data transmission system is constructed by a transmitter-side integrated circuit unit 1, a receiver-side integrated circuit unit 2, and transmission lines 3-1 and 3-2 connected between the transmitter-side integrated circuit unit 1 and the receiver-side integrated circuit unit 2. The transmitter-side integrated circuit unit 1 is formed by a signal transmission circuit 10 for transmitting an input signal IN generated in the internal circuit (not shown) of the transmitter-side integrated circuit unit 1 to the transmission lines 3-1 and 3-2. On the other hand, a receiver of the receiver-side integrated circuit unit 2 is formed by a signal reception circuit 21 connected to the transmission lines 3-1 and 3-2, a bias circuit 22 for supplying a bias voltage $V_B$ to the signal reception circuit 21, and an output circuit 23 connected to the signal reception circuit 21 for generating an output signal OUT and transmitting the output signal OUT to the internal circuit (not shown) of the receiver-side integrated circuit unit 2.

Figure 2:
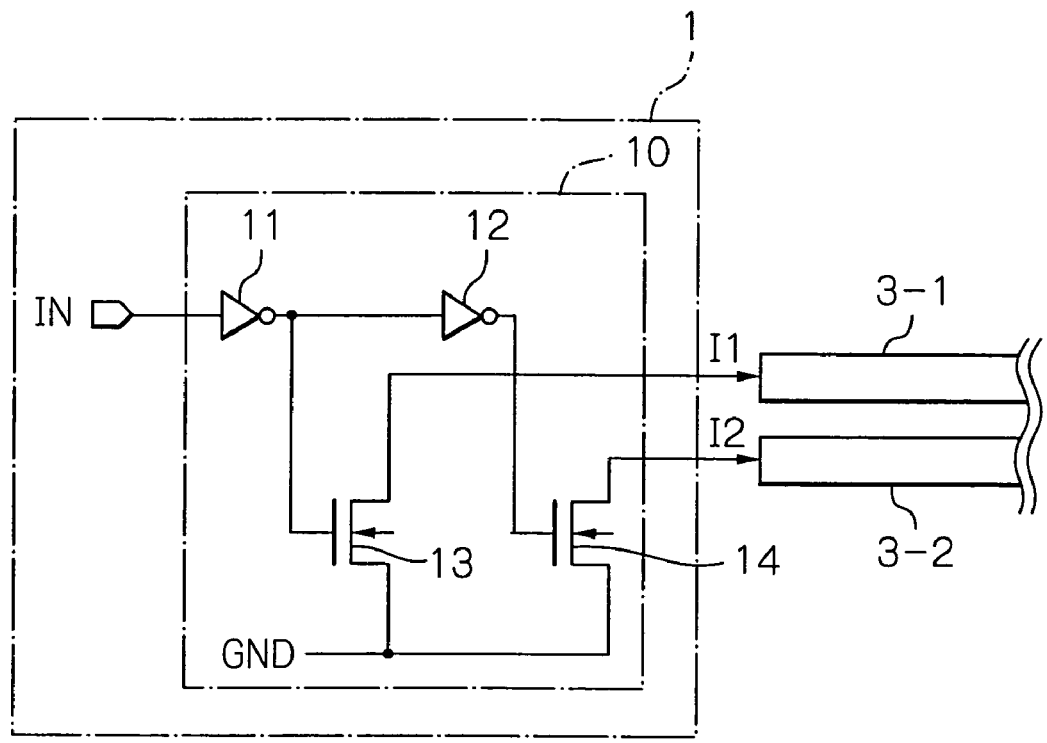
FIG. 2 is a detailed circuit diagram of the signal transmission circuit of FIG. 1.

In FIG. 2, which is a detailed circuit diagram of the signal transmission circuit 10 of FIG. 1, the signal transmission circuit 10 is constructed by inverters 11 and 12 connected in series for receiving the input signal IN, an n-channel MOS transistor 13 connected between the transmission line 3-1 and the ground terminal GND and whose gate is controlled by the output signal of the inverter 11, and an n-channel MOS transistor 14 connected between the transmission line 3-2 and the ground terminal GND and whose gate is controlled by the output signal of the inverter 12.

Figure 3A:
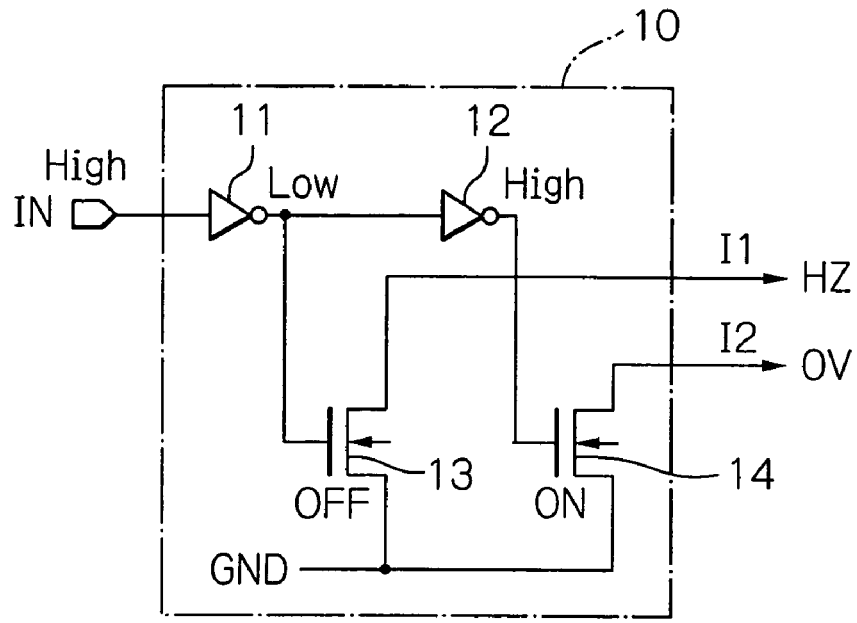
FIGS. 3A and 3B are circuit diagrams for explaining the operation of the signal transmission circuit of FIG. 2.

As shown in FIG. 3A which shows a first steady state, when the input signal IN is at a high level, the output signal of the inverter 11 is at a low level (=0V) to turn OFF the MOS transistor 13, so that the transmission line 3-1 is in a high impedance (HZ) state. Also, the output signal of the inverter 12 is at a high level to turn ON the MOS transistor 14, so that the transmission line 3-2 is at 0V.

Figure 3B:
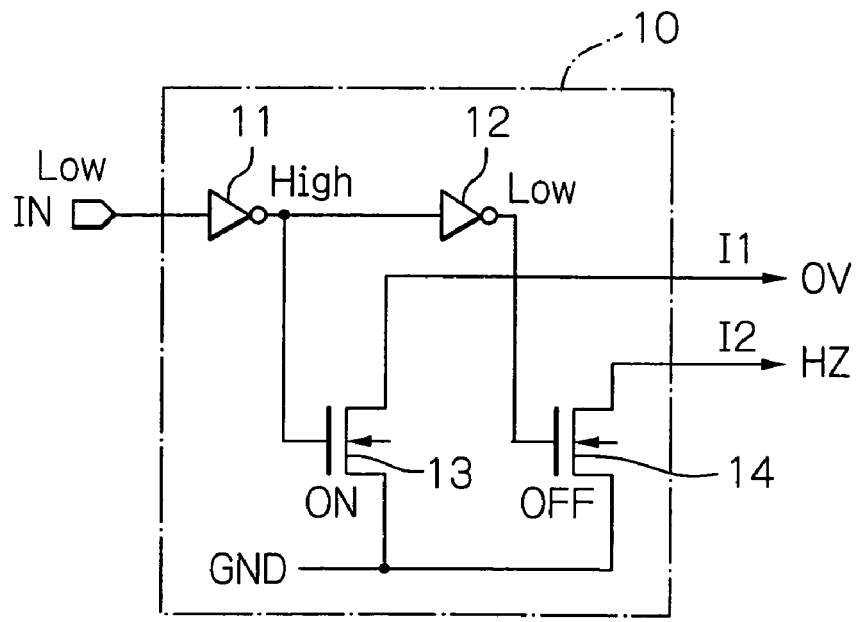

On the other hand, as shown in FIG. 3B which shows a second steady state, when the input signal IN is at a low level (=0V), the output signal of the inverter 11 is at a high level to turn ON the MOS transistor 13, so that the transmission line 3-1 is at 0V. Also, the output signal of the inverter 12 is at a low level (=0V) to turn OFF the MOS transistor 14, so that the transmission line 3-2 is in an HZ state.

In a transient state from the first steady state to the second steady state or vice versa, the transmission line 3-1 is from an HZ state to a 0V state or vice versa and the transmission line 3-2 is from a 0V state to an HZ state or vice versa.

Thus, the signal transmission circuit 10 generates input signals 11 and 12 at the transmission lines 3-1 and 3-2, respectively in accordance with the input signal IN generated in the internal circuit thereof.

Figure 4:
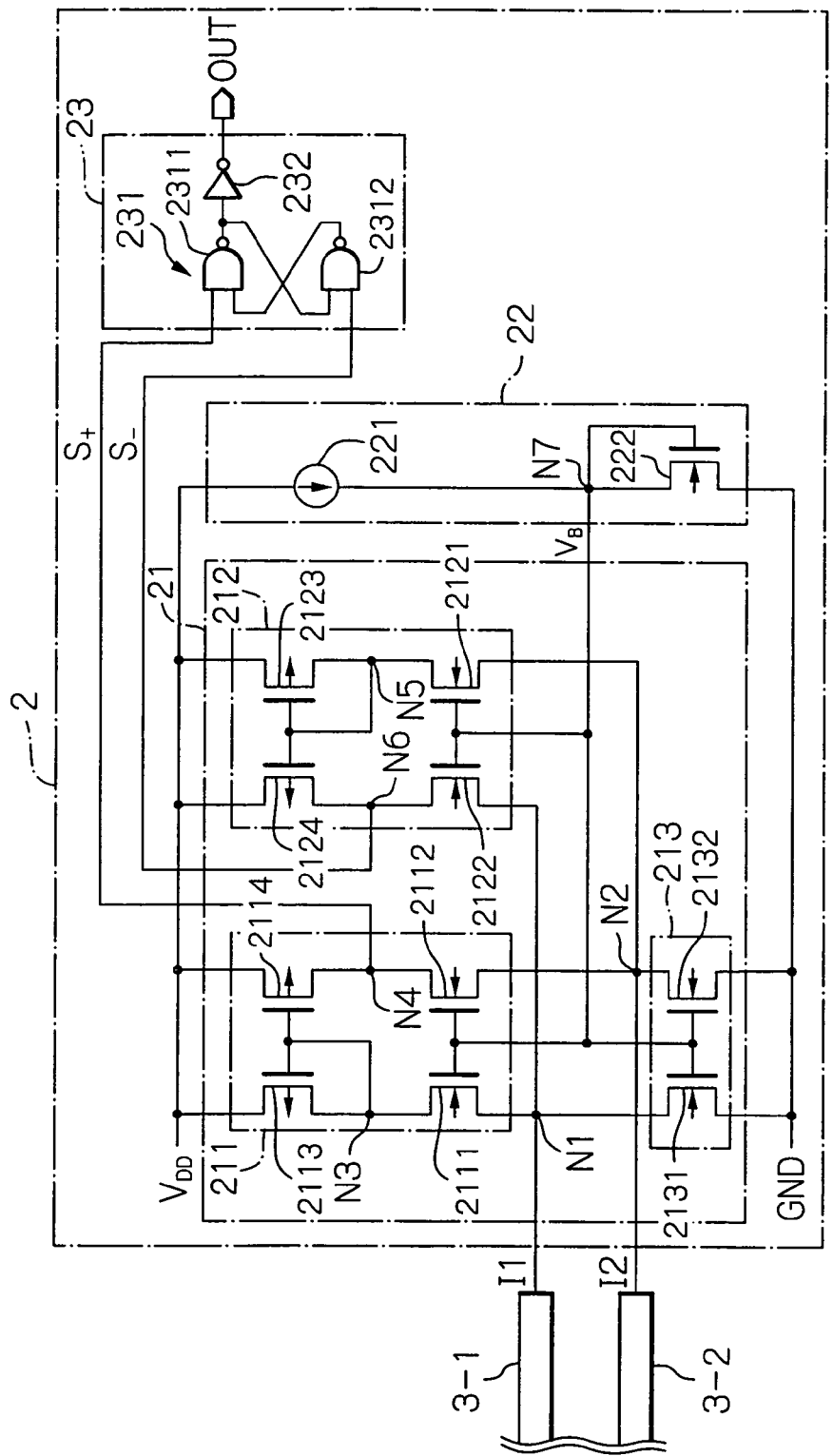
FIG. 4 is a detailed circuit diagram of the receiver, i.e., the signal reception circuit, the bias circuit and the output circuit of FIG. 1.

In FIG. 4, which is a detailed circuit diagram of the receiver, i.e., the signal reception circuit 21, the bias circuit 22 and the output circuit 23 of FIG. 1, the signal reception circuit 21 amplifies the input signals 11 and 12 at the transmission lines 3-1 and 3-2 by receiving the bias voltage $V_B$ of the bias circuit 22 to generate a non-inverted amplification signal $S_+$ and an inverted amplification signal $S_-$, and the output circuit 23 wave-shapes the non-inverted amplification signal $S_+$ and the inverted amplification signal $S_-$ to generate the output signal OUT.

The signal reception circuit 21 is constructed by a non-inverted amplification signal generating circuit 211 connected between a power supply terminal $V_{DD}$ and first and second input signal receiving nodes N1 and N2 connected to the transmission lines 3-1 and 3-2, respectively, for differentially amplifying the input signals 12 and 11 to generate the non-inverted amplification signal $S_+$, and an inverted amplification signal generating circuit 212 connected between the power supply terminal $V_{DD}$ and the nodes N1 and N2 connected to the transmission lines 3-1 and 3-2, respectively, for differentially amplifying the input signals I1 and 12 to generate the inverted amplification signal $S_-$, and a constant current source circuit 213 connected between the nodes N1 and N2 and the ground terminal GND.

The elements of the non-inverted amplification signal generating circuit 211 are symmetrical to those of the inverted amplification signal generating circuit 212, which will be explained below.

The non-inverted amplification signal generating circuit 211 is formed by n-channel MOS transistors 2111 and 2112 serving as amplifiers whose sources are connected to the nodes N1 and N2, respectively, a p-channel MOS transistor 2113 connected between the power supply terminal $V_{DD}$ and the drain of the n-channel MOS transistor 2111, and a p-channel MOS transistor 2114 connected between the power supply terminal $V_{DD}$ and the drain of the n-channel MOS transistor 2112. The bias voltage $V_B$ is applied to the gates of the n-channel MOS transistors 2111 and 2112. The gates of the p-channel MOS transistors 2113 and 2114 are connected to each other and are connected to the drain of the p-channel MOS transistor 2113, thus forming a current mirror circuit with a reference current input node N3 and a mirror current output node N4 for generating the non-inverted amplification signal $S_+$.

The inverted amplification signal generating circuit 212 is formed by n-channel MOS transistors 2121 and 2122 serving as amplifiers whose sources are connected to the nodes N2 and N1, respectively, a p-channel MOS transistor 2123 connected between the power supply terminal $V_{DD}$ and the drain of the n-channel MOS transistor 2121, and a p-channel MOS transistor 2124 connected between the power supply terminal $V_{DD}$ and the drain of the n-channel MOS transistor 2122. The bias voltage $V_B$ is applied to the gates of the n-channel MOS transistors 2121 and 2122. The gates of the p-channel MOS transistors 2123 and 2124 are connected to each other and are connected to the drain of the p-channel MOS transistor 2123, thus forming a current mirror circuit with a reference current input node N5 and a mirror current output node N6 for generating the non-inverted amplification signal $S_-$.

The constant current source circuit 213 is formed by an n-channel MOS transistor 2131 connected between the node N1 and the ground terminal GND and an n-channel MOS transistor 2132 connected between the node N2 and the ground terminal GND. The bias voltage $V_B$ is applied to the gates of the n-channel MOS transistors 2131 and 2132, so that each of the n-channel MOS transistors 2131 and 2132 serves as a constant current source.

The bias circuit 22 is constructed by a constant current source 221 and a drain-to-gate connected n-channel MOS transistor 222 connected in series between the power supply terminal $V_{DD}$ and the ground terminal GND. A node N7 between the constant current source 221 and the n-channel MOS transistor 222 generates the bias voltage $V_B$ which is supplied to the gates of the transistors 2111, 2112, 2121, 2122, 2131 and 2132.

The output circuit 23 is constructed by a latch circuit 231 formed by cross-coupled NAND circuits 2311 and 2312, and an inverter 232. In this case, the non-inverted amplification signal $S_+$ of the signal reception circuit 21 is supplied to one input of the NAND circuit 2311, and the inverted amplification signal $S_-$ of the signal reception circuit 21 is supplied to one input of the NAND circuit 2312. Therefore, when the non-inverted amplification signal $S_+$ is high and the inverted amplification signal $S_-$ is low, the output signal OUT is high. On the other hand, when the non-inverted amplification signal $S_+$ is low and the inverted amplification signal $S_-$ is high, the output signal OUT is low.

Generally, in the signal reception circuit 21, the n-channel MOS transistors 2111, 2112, 2121, 2122, 2131 and 2132 have very small driving ability.

The operation of the receiver of the receiver-side integrated circuit unit 2 is explained next.

In a first steady state of the signal transmission circuit 10 where the input signal IN is high as shown in FIG. 3A, the transmission line 3-1 is in an HZ state and the transmission line 3-2 is at 0V, so that the voltages at the nodes N1 and N2 are about 0.2V and 0V, respectively. Therefore, in the non-inverted amplification signal generating circuit 211, the n-channel MOS transistor 2112 is deeply turned ON while the n-channel MOS transistor 2111 is shallowly turned ON. As a result, a relatively-small current flows through the n-channel MOS transistor 2111 as well as the p-channel MOS transistors 2113 and 2114 of the current mirror circuit. In this case, since a relatively-large current flows through only the n-channel MOS transistor 2112, a low level signal at the node N4 is supplied as the non-inverted amplification signal $S_+$ to the latch circuit 231 of the output circuit 23 due to the relatively-small current flowing through the p-channel MOS transistor 2114. In other words, such a low level signal is obtained by amplifying the very small difference (=0V–0.2V) between the voltages at the nodes N2 and N1. Also, in the inverted amplification signal generating circuit 212, the n-channel MOS transistor 2121 is deeply turned ON while the n-channel MOS transistor 2122 is shallowly turned ON. As a result, a relatively-large current flows through the n-channel MOS transistor 2121 as well as the p-channel MOS transistors 2123 and 2124 of the current mirror circuit. In this case, since a relatively-small current flows through only the n-channel MOS transistor 2122, a high level signal at the node N6 is supplied as the inverted amplification signal $S_-$ to the latch circuit 232 of the output circuit 23 due to the relatively-large current flowing through the p-channel MOS transistor 2124. In other words, such a high level signal is obtained by amplifying the very small difference (=0.2V–0V) between the voltages at the nodes N1 and N2.

Note that, since the transmission line 3-1 is in an HZ state, the total relatively-small currents flowing through the n-channel MOS transistors 2111 and 2122 flow through the n-channel MOS transistor 2131 of the constant current source circuit 213.

In a second steady state of the signal transmission circuit 10 where the input signal IN is low as shown in FIG. 3A, the transmission line 3-1 is at 0V and the transmission line 3-2 is in an HZ state, so that the voltages at the nodes N1 and N2 are 0V and about 0.2V, respectively. Therefore; in the non-inverted amplification signal generating circuit 211, the n-channel MOS transistor 2111 is deeply turned ON while the n-channel MOS transistor 2112 is shallowly turned ON. As a result, a relatively-large current flows through the n-channel MOS transistor 2111 as well as the p-channel MOS transistors 2113 and 2114 of the current mirror circuit. In this case, since a relatively-small current flows through only the n-channel MOS transistor 2112, a high level signal at the node N4 is supplied as the non-inverted amplification signal $S_+$ to the latch circuit 231 of the output circuit 23 due to the relatively-large current flowing through the p-channel MOS transistor 2114. In other words, such a high level signal is obtained by amplifying the very small difference (=0.2V–0V) between the voltages at the nodes N2 and N1. Also, in the inverted amplification signal generating circuit 212, the n-channel MOS transistor 2122 is deeply turned ON while the n-channel MOS transistor 2121 is shallowly turned ON. As a result, a relatively-small current flows through the n-channel MOS transistor 2121 as well as the p-channel MOS transistors 2123 and 2124 of the current mirror circuit. In this case, since a relatively-large current flows through only the n-channel MOS transistor 2122, a low level signal at the node N6 is supplied as the inverted amplification signal $S_-$ to the latch circuit 232 of the output circuit 23 due to the relatively-small current flowing through the p-channel MOS transistor 2124. In other words, such a low level signal is obtained by amplifying the very small difference (=0V–0.2V) between the voltages at the nodes N1 and N2.

Note that, since the transmission line 3-2 is in an HZ state, the total relatively-small currents flowing through the n-channel MOS transistors 2112 and 2121 flow through the n-channel MOS transistor 2132 of the constant current source circuit 213.

Thus, in the receiver of the receiver-side integrated circuit unit 2 of FIG. 4, since the power consumption depends upon two of the n-channel MOS transistors 2111, 2112, 2121 and 2122 which are deeply turned ON, if the driving ability of the n-channel MOS transistors 2111, 2112, 2121 and 2122 are very small, the power consumption can be decreased.

In the receiver of the receiver-side integrated circuit unit 2 of FIG. 4, however, since the n-channel MOS transistors 2111, 2112, 2121 and 2122 have very small driving ability, the voltages at the output nodes N4 and N6 of the current mirror circuits cannot be changed at a high speed, which means that the receiver of the receiver-side integrated circuit unit 2 cannot be operated at a high speed.

In order to increase the operation speed of the receiver of the receiver-side integrated circuit unit 2 of FIG. 4, the driving ability of the n-channel MOS transistors 2111, 2112, 2121 and 2122 can be increased to increase currents flowing therethrough. In this case, however, the power consumption is increased. Note that in a steady state of data transmission without clock signals, even when the input signal IN, i.e., the input signals 11 and 12 are not changed as shown in FIG. 3A or 3B, since two of the n-channel MOS transistors 2111, 2112, 2121 and 2122 are always deeply turned ON, the total currents flowing through the n-channel MOS transistors 2111, 2112, 2121 and 2122 are increased. Thus, there is a trade-off relationship between the operation speed and the power consumption.

Figure 5:
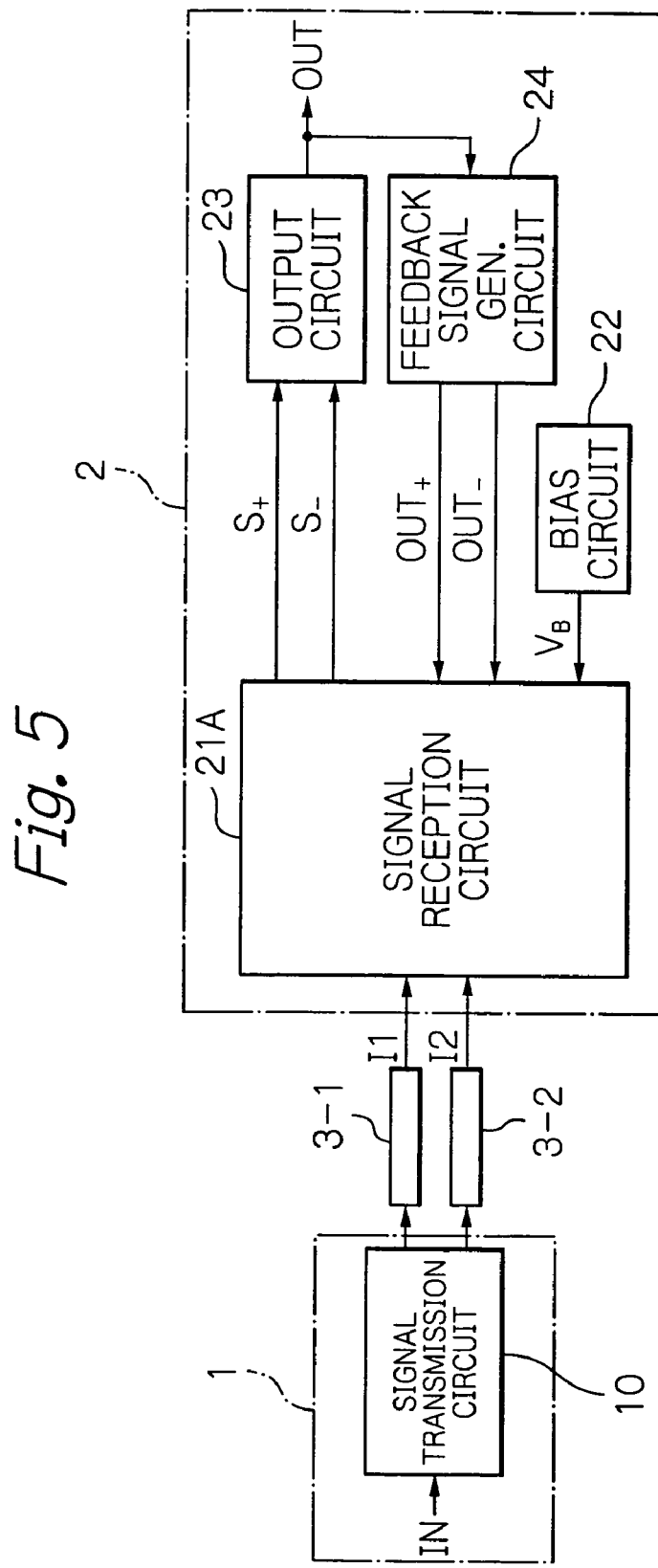
FIG. 5 is a block circuit diagram illustrating a data transmission system including a first embodiment of the receiver according to the present invention.

In FIG. 5, which illustrates a data transmission including a first embodiment of the receiver system according to the present invention, the signal reception circuit 21 of FIG. 1 is replaced by a signal reception circuit 21A, and a feedback signal generating circuit 24 is added to the elements of the receiver of the receiver-side integrated circuit unit 2 of FIG. 1. The feedback signal generating circuit 24 generates a non-inverted feedback signal $OUT_+$ and an inverted feedback signal $OUT_-$ in accordance with the output signal OUT of the output circuit 23 and transmits them to the signal reception circuit 21A.

FIG. 6 is a detailed circuit diagram of the receiver, i.e., the signal reception circuit 21A, the bias circuit 22, the output circuit 23 and the feedback signal generating circuit 24 of FIG. 5.

In the signal reception circuit 21A, the non-inverted amplification signal generating circuit 211 and the inverted amplification signal generating circuit 212 of FIG. 4 are replaced by a non-inverted amplification signal generating circuit 211A and an inverted amplification signal generating circuit 212A, respectively.

In the non-inverted amplification signal generating circuit 211A, a series of an n-channel MOS transistor 2111A-1 serving as an amplifier and an n-channel MOS transistor 2111A-2 serving as a switch are added to the non-inverted amplification signal generating circuit 211 of FIG. 4 and are connected in parallel with the n-channel MOS transistor 2111, i.e., between the nodes N3 and N1. That is, the bias voltage $V_B$ is applied to the gate of the n-channel MOS transistor 2111A-1 so that the n-channel MOS transistor 2111A-1 serves as an amplifier in the same way as the n-channel MOS transistor 2111. On the other hand, the inverted feedback signal $OUT_-$ is applied to the gate of the n-channel MOS transistor 2111A-2 serving as a switch. Therefore, when the inverted feedback signal $OUT_-$ is high to switch ON the n-channel MOS transistor 2111A-2, the n-channel MOS transistors 2111 and 2111A-1 serve as one amplifier. On the other hand, when the inverted feedback signal OUT is low to switch OFF the n-channel MOS transistor 2111A-2, the n-channel MOS transistor 2111 serves as one amplifier.

Also, in the non-inverted amplification signal generating circuit 211A, a series of an n-channel MOS transistor 2112A-1 serving as an amplifier and an n-channel MOS transistor 2112A-2 serving as a switch are added to the non-inverted amplification signal generating circuit 211 of FIG. 4 and is connected in parallel with the n-channel MOS transistor 2112, i.e., between the nodes N4 and N2. That is, the bias voltage $V_B$ is applied to the gate of the n-channel MOS transistor 2112A-1 so that the n-channel MOS transistor 2112A-1 serves as an amplifier in the same way as the n-channel MOS transistor 2112. On the other hand, the non-inverted feedback signal $OUT_+$ is applied to the gate of the n-channel MOS transistor 2112A-2 serving as a switch. Therefore, when the non-inverted feedback signal $OUT_+$ is high to switch ON the n-channel MOS transistor 2112A-2, the n-channel MOS transistors 2112 and 2112A-1 serve as one amplifier. On the other hand, when the non-inverted feedback signal $OUT_+$ is low to switch OFF the n-channel MOS transistor 2112A-2, the n-channel MOS transistor 2112 serves as one amplifier.

Similarly, in the inverted amplification signal generating circuit 212A, a series of an n-channel MOS transistor 2121A-1 serving as an amplifier and an n-channel MOS transistor 2121A-2 serving as a switch are added to the non-inverted amplification signal generating circuit 212 of FIG. 4 and are connected in parallel with the n-channel MOS transistor 2121, i.e., between the nodes N5 and N2. That is, the bias voltage $V_B$ is applied to the gate of the n-channel MOS transistor 2121A-1 so that the n-channel MOS transistor 2121A-1 serves as an amplifier in the same way as the n-channel MOS transistor 2121. On the other hand, the non-inverted feedback signal $OUT_+$ is applied to the gate of the n-channel MOS transistor 2121A-2 serving as a switch. Therefore, when the non-inverted feedback signal $OUT_+$ is high to switch ON the n-channel MOS transistor 2121A-2, the n-channel MOS transistors 2121 and 2121A-1 serve as one amplifier. On the other hand, when the non-inverted feedback signal $OUT_+$ is low to switch OFF the n-channel MOS transistor 2121A-2, the n-channel MOS transistor 2121 serves as one amplifier.

Also, in the non-inverted amplification signal generating circuit 212A, a series of an n-channel MOS transistor 2122A-1 serving as an amplifier and an n-channel MOS transistor 2122A-2 serving as a switch are added to the non-inverted amplification signal generating circuit 212 of FIG. 4 and are connected in parallel with the n-channel MOS transistor 2122, i.e., between the nodes N6 and N1. That is, the bias voltage $V_B$ is applied to the gate of the n-channel MOS transistor 2122A-1 so that the n-channel MOS transistor 2122A-1 serves as an amplifier in the same way as the n-channel MOS transistor 2122. On the other hand, the inverted feedback signal $OUT_-$ is applied to the gate of the n-channel MOS transistor 2122A-2 serving as a switch. Therefore, when the inverted feedback signal $OUT_-$ is high to switch ON the n-channel MOS transistor 2122A-2, the n-channel MOS transistors 2122 and 2122A-1 serve as one amplifier. On the other hand, when the inverted feedback signal $OUT_-$ is low to switch OFF the n-channel MOS transistor 2122A-2, the n-channel MOS transistor 2122 serves as one amplifier.

In the feedback signal generating circuit 24 of FIG. 6, two inverters 241 and 242 are connected in series to the output of the output circuit 23. That is, the feedback signal generating circuit 24 generates the non-inverted feedback signal $OUT_+$ and the inverted feedback signal $OUT_-$ from its inverters 242 and 241, respectively, in accordance with the output signal OUT of the output circuit 23.

The operation of the receiver of the receiver-side integrated circuit unit 2 of FIG. 6 is explained next with reference to FIGS. 7A, 7B and 7C. Here, FIG. 7A shows a steady state where the input signal IN of the transmitter circuit 10 is high as shown in FIG. 3A, FIG. 7B shows a transient state where the input signal IN of the transmitter circuit 10 is switched from a high level as shown in FIG. 3A to a low level as shown in FIG. 3B, and FIG. 7C shows a steady state where the input signal IN of the transmitter circuit 10 is low as shown in FIG. 3B.

Figure 7A:
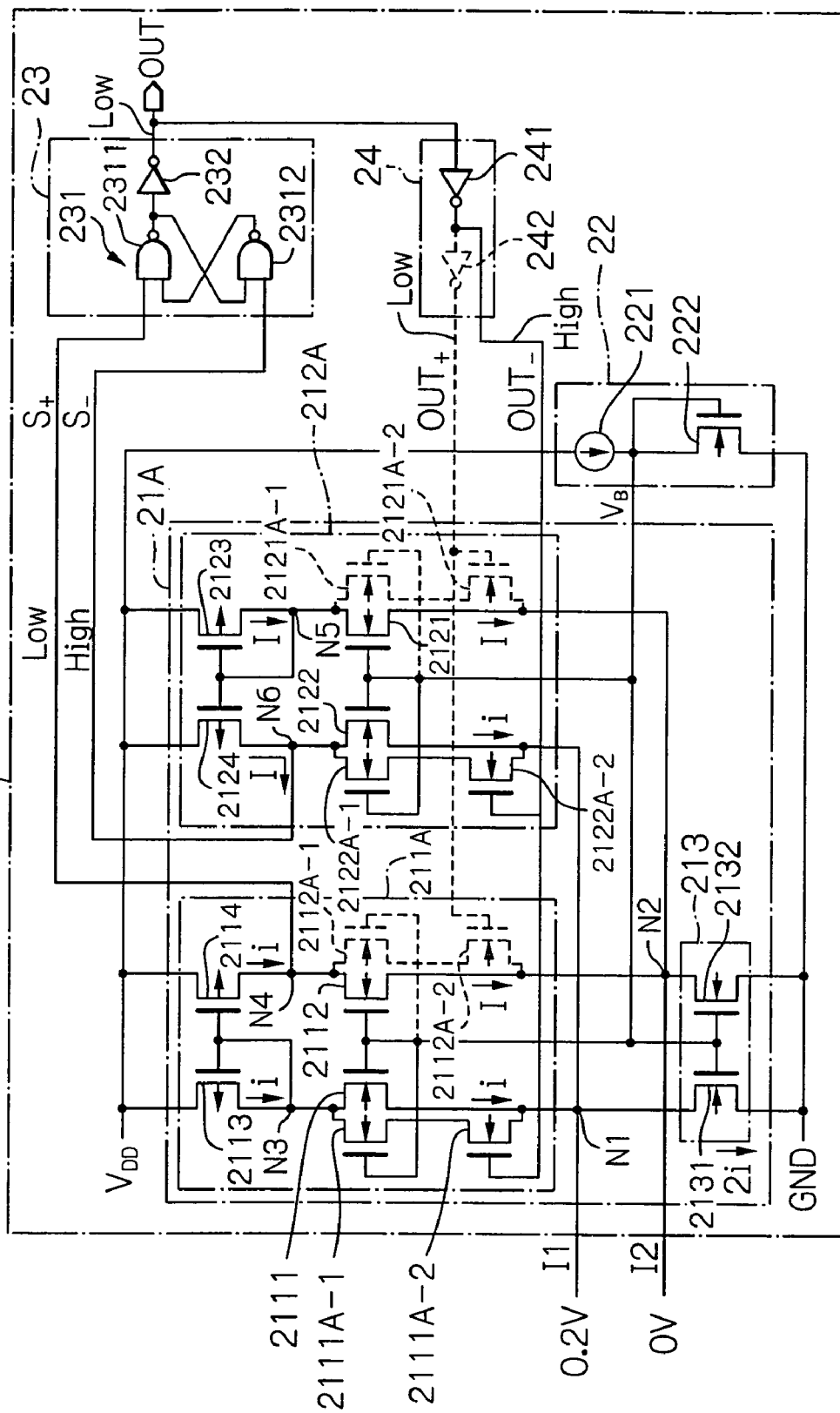
FIGS. 7A, 7B and 7C are circuit diagrams for explaining the operation of the receiver of FIG. 6.
Figure 7B:
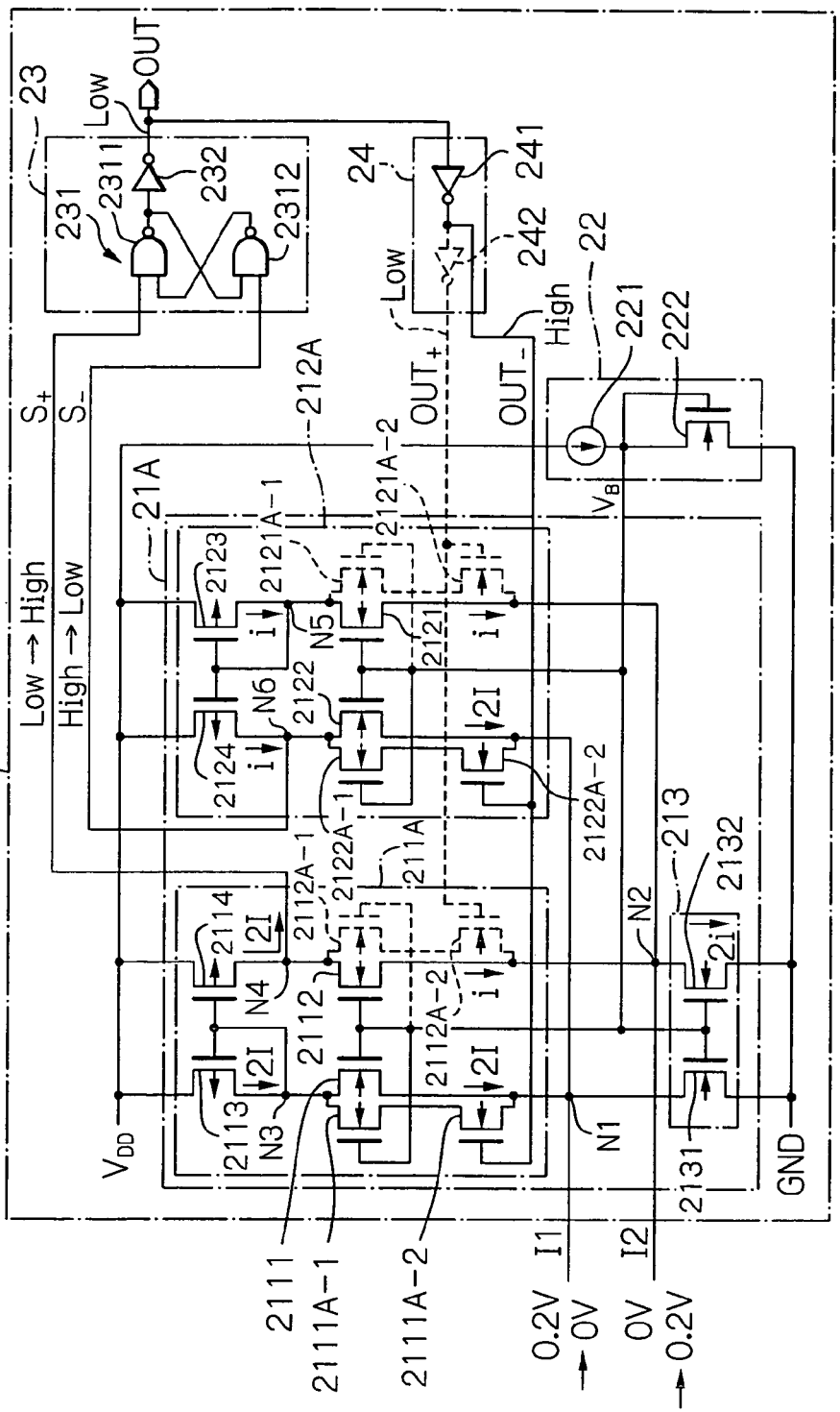
Figure 7C:
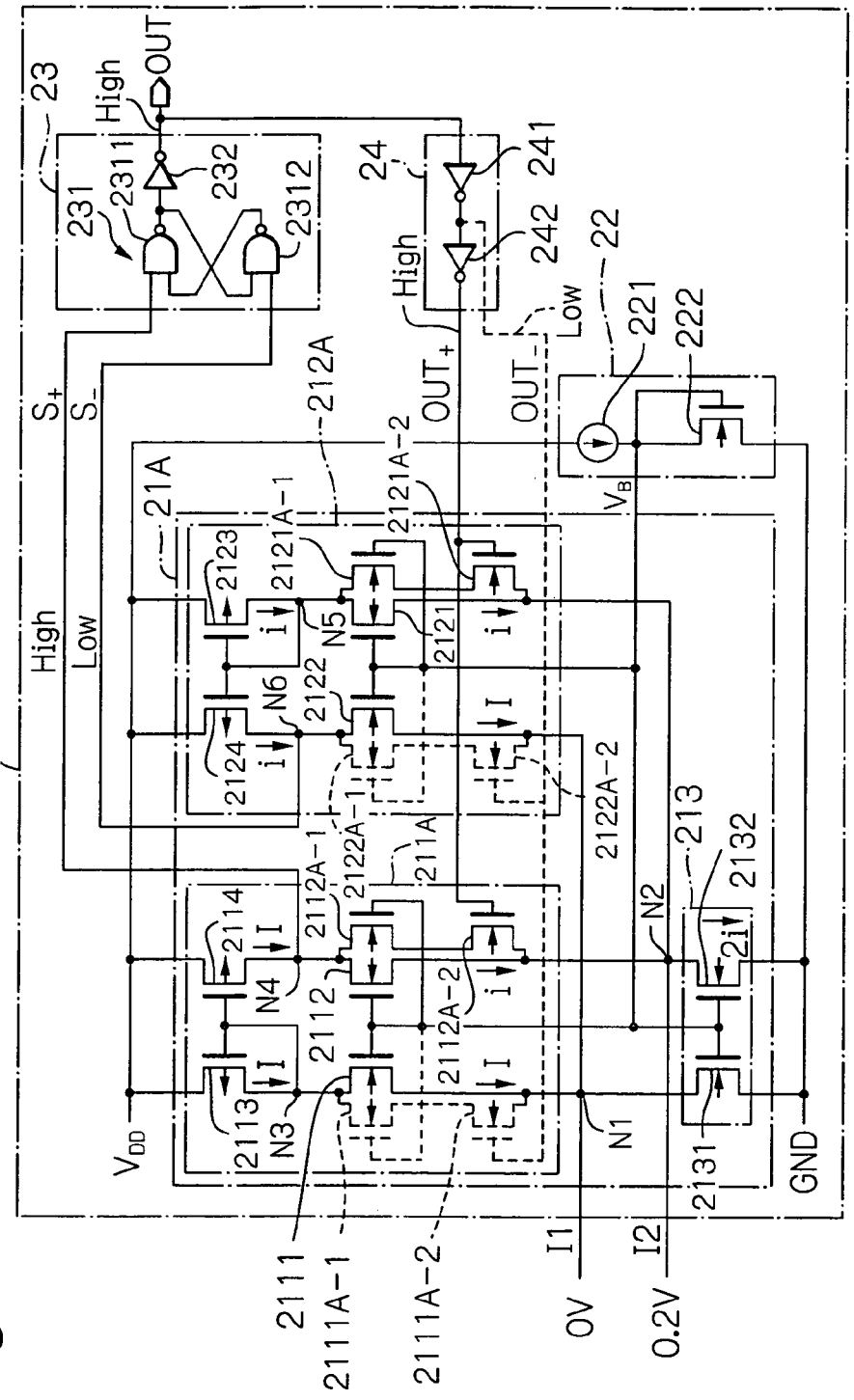

First, referring to FIG. 7A, in a first steady state of the transmitter circuit 10 where the input signal IN is high as shown in FIG. 3A, the transmission line 3-1 is in an HZ state and the transmission line 3-2 is at 0V, so that the voltages at the nodes N1 and N2 are about 0.2V and 0V, respectively. At this time, it will be determined that the non-inverted amplification signal $S_+$ is low and the inverted amplification signal $S_-$ is high, so that the output signal OUT is low. Therefore, the non-inverted feedback signal $OUT_+$ is low and the inverted feedback signal OUT is high. As a result, in the non-inverted amplification signal generating circuit 211A, the n-channel MOS transistor 2111A-2 is switched ON so that the n-channel MOS transistors 2111 and 2111A-1 serve as one amplifier whose driving ability has about twice the driving ability of the n-channel MOS transistor 2111, while the n-channel MOS transistor 2112A-2 is switched OFF so that the n-channel MOS transistor 2112A-1 is deactivated. Also, in the inverted amplification signal generating circuit 212A, the n-channel MOS transistor 2122A-2 is switched ON so that the n-channel MOS transistors 2122 and 2122A-1 serve as one amplifier whose driving ability has about twice the driving ability of the n-channel MOS transistor 2121, while the n-channel MOS transistor 2121A-2 is switched OFF so that the n-channel MOS transistor 2121A-1 is deactivated.

Therefore, in the non-inverted amplification signal generating circuit 211A, the n-channel MOS transistor 2112 is deeply turned ON while the n-channel MOS transistors 2111 and 2111A-1 are shallowly turned ON. As a result, a relatively-small current represented by "i" flows through the n-channel MOS transistors 2111 and 2111A-1 as well as the p-channel MOS transistors 2113 and 2114 of the current mirror circuit. In this case, since a relatively-large current represented by "I" flows through only the n-channel MOS transistor 2112, a low level signal at the node N4 is supplied as the non-inverted amplification signal St to the latch circuit 231 of the output circuit 23 due to the relatively-small current flowing through the p-channel MOS transistor 2114. In other words, such a low level signal is obtained by amplifying the very small difference (=0V–0.2V) between the voltages at the nodes N2 and N1. Also, in the inverted amplification signal generating circuit 212A, the n-channel MOS transistor 2121 is deeply turned ON while the n-channel MOS transistors 2122 and 2122A-1 are shallowly turned ON. As a result, a relatively-large current represented by "I" flows through the n-channel MOS transistor 2121 as well as the p-channel MOS transistor 2123 and 2124 of the current mirror circuit. In this case, since a relatively-small current represented by "i" flows through only the n-channel MOS transistors 2122 and 2122A-1, a high level signal at the node N6 is supplied as the inverted amplification signal S_ to the latch circuit 232 of the output circuit 23 due to the relatively-large current flowing through the p-channel MOS transistor 2124. In other words, such a high level signal is obtained by amplifying the very small difference (=0.2V–0V) between the voltages at the nodes N1 and N2.

Note that, since the transmission line 3-1 is in an HZ state, the total relatively-small currents "2i" flowing through the n-channel MOS transistors 2111, 2111A-1, 2121 and 2121A-1 flow through the n-channel MOS transistor 2131 of the constant current source circuit 213.

Thus, in FIG. 7A, even when the amplifier formed by the two n-channel MOS transistors 2111 and 2111A-1 has substantially high driving ability and also, the amplifier formed by the two n-channel MOS transistors 2122 and 2122A-1 has substantially high driving ability, since these high driving ability amplifiers are shallowly turned ON, the power consumption is not so increased as compared with the receiver of FIG. 4.

Next, referring to FIG. 7B, in a transient state of the transmitter circuit 10 where the input signal IN is switched from high to low as shown in FIG. 3B, the transmission line 3-1 is at 0V and the transmission line 3-2 is in an HZ state, so that the voltages at the nodes N1 and N2 are about 0V and 0.2V, respectively. Even at this time, the non-inverted feedback signal OUT₊ is still low and the inverted feedback signal OUT_ is still high. That is, in the non-inverted amplification signal generating circuit 211A, the n-channel MOS transistor 2111A-2 is switched ON so that the n-channel MOS transistors 2111 and 2111A-1 serve as one amplifier whose driving ability has about twice the driving ability of the n-channel MOS transistor 2111, while the n-channel MOS transistor 2112A-2 is switched OFF so that the n-channel MOS transistor 2112A-1 is deactivated. Also, in the inverted amplification signal generating circuit 212A, the n-channel MOS transistor 2122A-2 is switched ON so that the n-channel MOS transistors 2122 and 2122A-1 serve as one amplifier whose driving ability has about twice the driving ability of the n-channel MOS transistor 2121, while the n-channel MOS transistor 2121A-2 is switched OFF so that the n-channel MOS transistor 2121A-1 is deactivated.

Therefore, in the non-inverted amplification signal generating circuit 211A, the n-channel MOS transistor 2111 and 2111A-1 are deeply turned ON while the n-channel MOS transistors 2112 is shallowly turned ON. As a result, a considerably-large current represented by "2I" flows through the n-channel MOS transistors 2111 and 2111A-1 as well as the p-channel MOS transistors 2113 and 2114 of the current mirror circuit. In this case, since a relatively-small current represented by "i" flows through only the n-channel MOS transistor 2112, the low level signal at the node N4 is rapidly switched to a high level signal, and this high level signal is supplied as the non-inverted amplification signal S₊ to the latch circuit 231 of the output circuit 23 due to the relatively-small current flowing through the p-channel MOS transistor 2112. In other words, such a high level signal is obtained by rapidly amplifying the very small difference (=0V–0.2V) between the voltages at the nodes N2 and N1. Also, in the inverted amplification signal generating circuit 212A, the n-channel MOS transistors 2122 and 2122A-1 are deeply turned ON while the n-channel MOS transistor 2121 is shallowly turned ON. As a result, a relatively-small current represented by "i" flows through the n-channel MOS transistor 2121 as well as the p-channel MOS transistors 2123 and 2124 of the current mirror circuit. In this case, since a relatively-small current represented by "i" flows through the n-channel MOS transistor 2124, a high level signal at the node N6 is rapidly switched to a low level signal, and this low level signal is supplied as the inverted amplification signal S_ to the latch circuit 232 of the output circuit 23 due to the relatively-small current flowing through the p-channel MOS transistor 2124. In other words, such a low level signal is obtained by rapidly amplifying the very small difference (=0.2V–0V) between the voltages at the nodes N1 and N2.

Note that, since the transmission line 3-2 is in an HZ state, the total relatively-small currents "2i" flowing through the n-channel MOS transistors 2112 and 2121 flow through the n-channel MOS transistor 2132 of the constant current source circuit 213.

Thus, in FIG. 7B, the amplifier formed by the two n-channel MOS transistors 2111 and 2111A-1 has a substantially high driving ability and also, the amplifier formed by the two n-channel MOS transistors 2121 and 2121A-1 has a substantially high driving ability, and also, these high driving ability amplifiers are deeply turned ON. As a result, although the power consumption is considerably increased as compared with the receiver of FIG. 4, the non-inverted amplification signal S₊ and the inverted amplification signal S_ can be rapidly switched to obtain a high speed operation.

Finally, referring to FIG. 7C, in a second steady state of the transmitter circuit 10 where the input signal IN is low as shown in FIG. 3B, the transmission line 3-1 is at 0V and the transmission line 3-2 is in an HZ state, so that the voltages at the nodes N1 and N2 are about 0V and 0.2V, respectively. At this time, the non-inverted amplification signal S₊ is high and the inverted amplification signal S_ is low, so that the output signal OUT is high. Therefore, the non-inverted feedback signal OUT₊ is high and the inverted feedback signal OUT_ is low. As a result, in the non-inverted amplification signal generating circuit 211A, the n-channel MOS transistor 2112A-2 is switched ON so that the n-channel MOS transistors 2112 and 2112A-1 serve as one amplifier whose driving ability has about twice the driving ability of the n-channel MOS transistor 2112, while the n-channel MOS transistor 2111A-2 is switched OFF so that the n-channel MOS transistor 2111A-1 is deactivated. Also, in the inverted amplification signal generating circuit 212A, the n-channel MOS transistor 2121A-2 is switched ON so that the n-channel MOS transistors 2121 and 2121A-1 serve as one amplifier whose driving ability has about twice the driving ability of the n-channel MOS transistor 2121, while the n-channel MOS transistor 2122A-2 is switched OFF so that the n-channel MOS transistor 2112A-1 is deactivated.

Therefore, in the non-inverted amplification signal generating circuit 211A, the n-channel MOS transistor 2111 is deeply turned ON while the n-channel MOS transistors 2112 and 2112A-1 are shallowly turned ON. As a result, a relatively-large current represented by "I" flows through the n-channel MOS transistors 2111 and 2111A-1 as well as the p-channel MOS transistors 2113 and 2114 of the current mirror circuit. In this case, since a relatively-small current represented by "i" flows through only the n-channel MOS transistor 2112, a high level signal at the node N4 is supplied as the non-inverted amplification signal $S_+$ to the latch circuit 231 of the output circuit 23 due to the relatively-large current flowing through the p-channel MOS transistor 2114. In other words, such a high level signal is obtained by amplifying the very small difference (≈0.2V–0V) between the voltages at the nodes N2 and N1. Also, in the inverted amplification signal generating circuit 212A, the n-channel MOS transistor 2122 is deeply turned ON while the n-channel MOS transistors 2121 and 2121A-1 are shallowly turned ON. As a result, a relatively-small current represented by "i" flows through the n-channel MOS transistors 2121 and 2121A-1 as well as the p-channel MOS transistors 2123 and 2124 of the current mirror circuit. In this case, since a relatively-large current represented by "I" flows through only the n-channel MOS transistor 2122, a low level signal at the node N6 is supplied as the inverted amplification signal $S_-$ to the latch circuit 232 of the output circuit 23 due to the relatively-small current flowing through the p-channel MOS transistor 2124. In other words, such a low level signal is obtained by amplifying the very small difference (≈0V–0.2V) between the voltages at the nodes N1 and N2.

Note that, since the transmission line 3-2 is in an HZ state, the total relatively-small currents "2i" flowing through the n-channel MOS transistors 2112, 2112A-1, 2121 and 2121A-1 flow through the n-channel MOS transistor 2132 of the constant current source circuit 213.

Thus, in FIG. 7C, even when the amplifier formed by the two n-channel MOS transistors 2111 and 2111A-1 has a substantially high driving ability and also, the amplifier formed by the two n-channel MOS transistors 2121 and 2121A-1 has a substantially high driving ability, since these high driving ability amplifiers are shallowly turned ON, the power consumption is not so increased as compared with the receiver of FIG. 4.

Thus, in the first embodiment, the operation of the receiver can be at a high speed. In this case, although the power consumption is considerably increased only in a transient state, the increase of the power consumption in a steady state can be suppressed so that the increase of the entire power consumption can be suppressed.

Figure 8A:
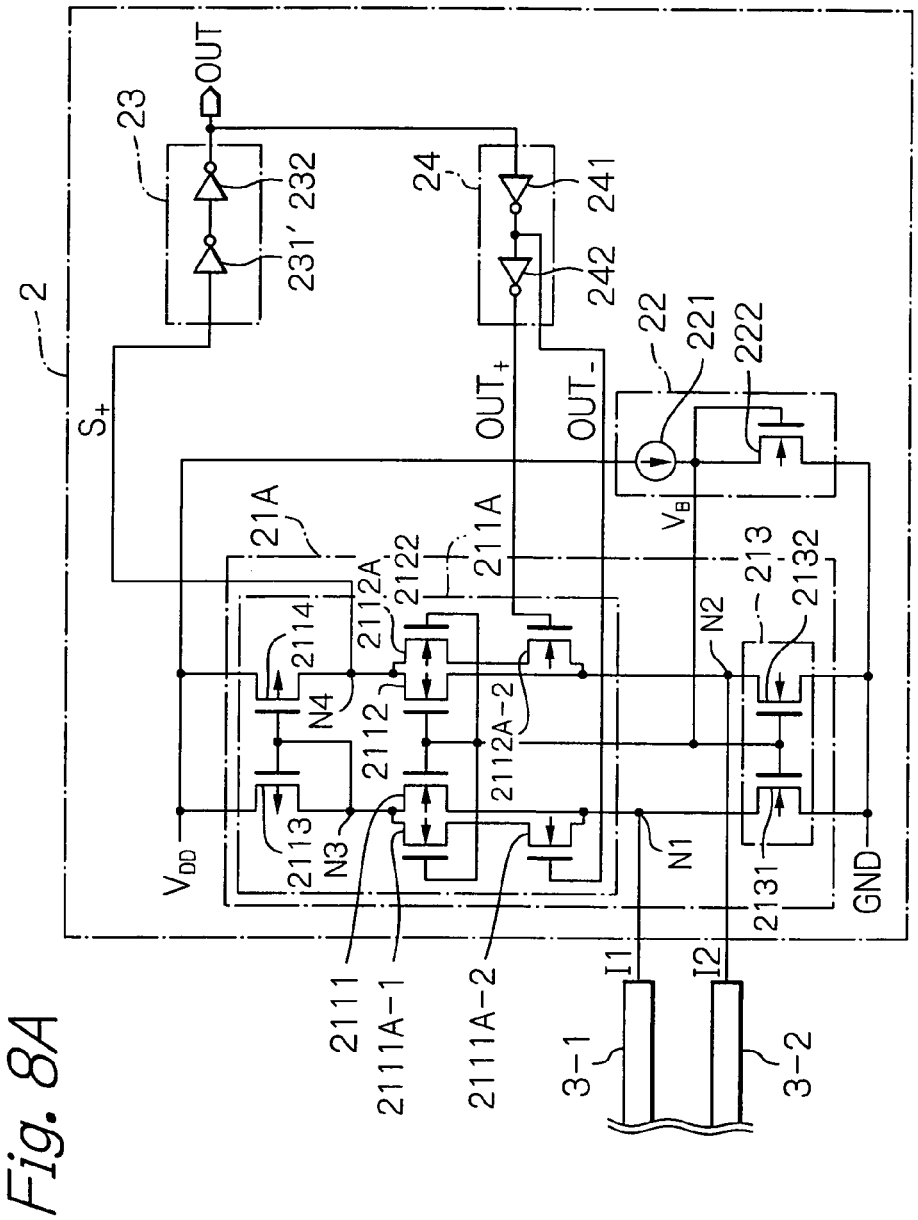
FIGS. 8A and 8B are circuit diagrams illustrating modifications of the receiver of FIG. 6.

As illustrated in FIG. 8A, one of the non-inverted amplification signal generating circuit 211A and the inverted amplification signal generating circuit 212A can be omitted. For example, the inverted amplification signal generating circuit 212A of FIG. 6 is omitted. In this case, the output circuit 23 is constructed by an inverter 231' instead of the latch circuit 231 of FIG. 6. Also, the output circuit 23 can be combined with the feedback signal generating circuit 24. Note that, if the non-inverted amplification signal generating circuit 211A of FIG. 6 is omitted, the inverter 231 is also omitted.

Figure 8B:
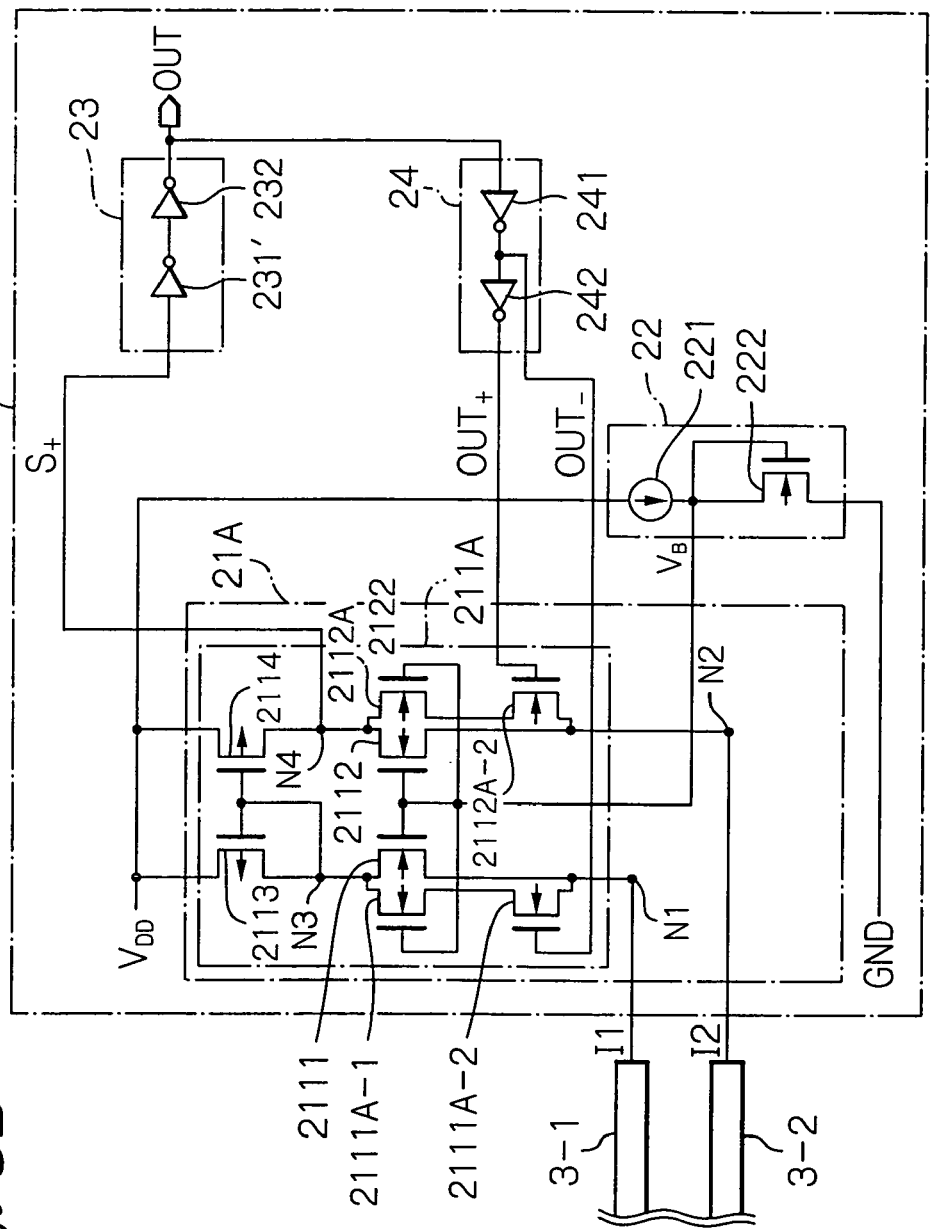

Also, as illustrated in FIG. 8B, the constant current source circuit 213 can be omitted. In this case, there is no relatively-small current flowing through the n-channel MOS transistors 2111, 2111A-1, 2112 and 2112A-1 if they are connected to an HZ state transmission line. That is, the constant current source circuit 213 is not indispensable.

In FIG. 9, which illustrates a data transmission system including a second embodiment of the receiver system according to the present invention, the signal reception circuit 21 of FIG. 1 is replaced by a signal reception circuit 21B, and the bias circuit 22 of FIG. 1 is replaced by two bias circuits 22-1 and 22-2 for generating different bias voltages $V_{B1}$ and $V_{B2}$, respectively. Also, the feedback signal generating circuit 24 of FIG. 5 is added to the elements of the receiver of the receiver-side integrated circuit unit 2 of FIG. 1. In this case, the feedback signal generating circuit 24 transmits the non-inverted feedback signal $OUT_+$ and the inverted feedback signal $OUT_-$ to the bias circuits 22-2 and 22-1, respectively, not to the signal reception circuit 21B.

Figure 10:
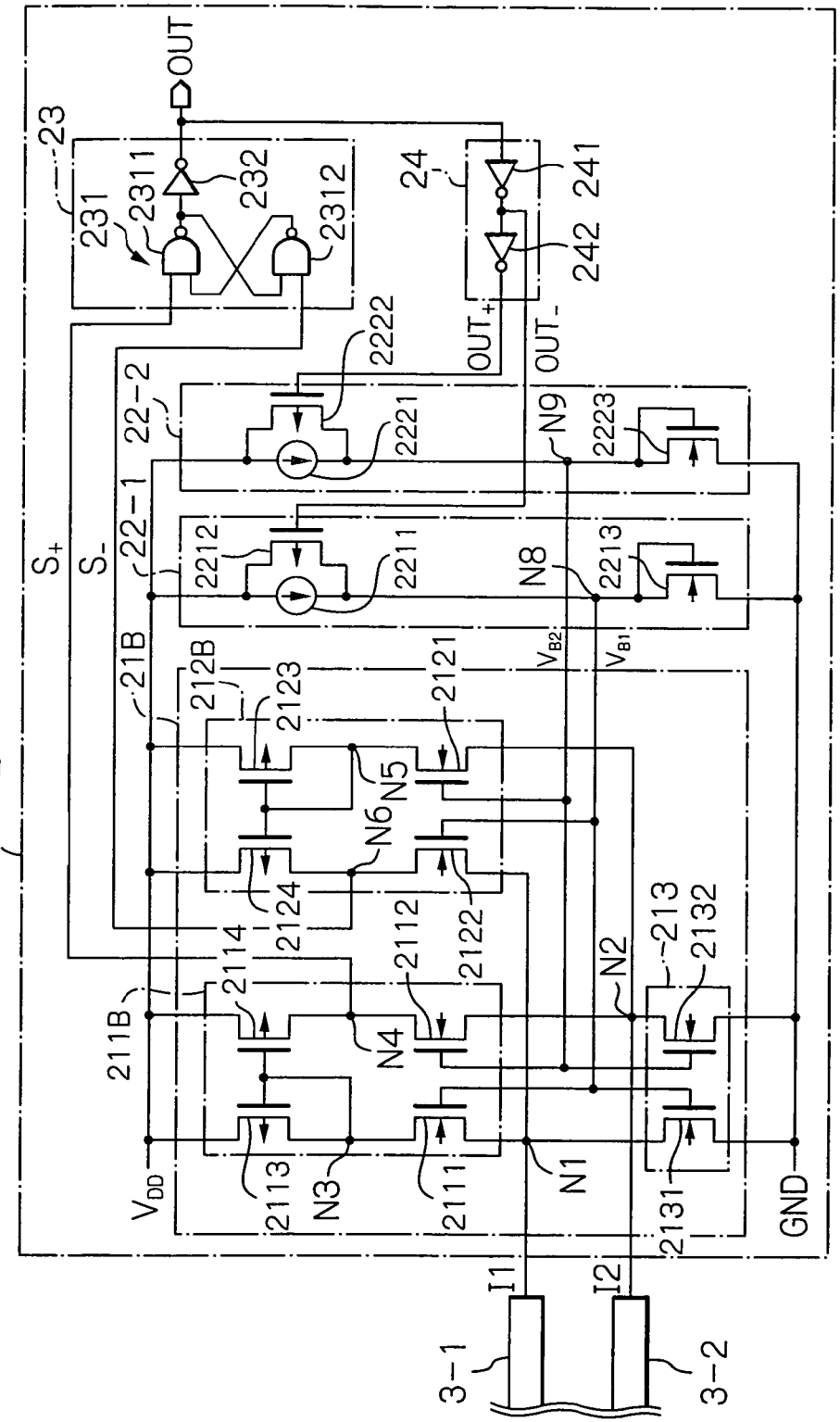
FIG. 10 is a detailed circuit diagram of the receiver, i.e., the signal reception circuit, the bias circuits, the output circuit and the feedback signal generating circuit of FIG. 5.

FIG. 10 is a detailed circuit diagram of the receiver, i.e., the signal reception circuit 21B, the bias circuits 22-1 and 22-2, the output circuit 23 and the feedback signal generating circuit 24 of FIG. 9.

In the signal reception circuit 21B, the non-inverted amplification signal generating circuit 211 and the inverted amplification signal generating circuit 212 of FIG. 4 are replaced by a non-inverted amplification signal generating circuit 211B and an inverted amplification signal generating circuit 212B, respectively.

Also, in the signal reception circuit 21B, the bias voltage $V_{B1}$ is applied to the gates of the n-channel MOS transistors 2111, 2122 and 2131, while the bias voltage $V_{B2}$ is applied to the gates of the n-channel MOS transistors 2112, 2121 and 2132.

The bias circuit 22-1 is constructed by a constant current source 2211 and an auxiliary constant current source 2212 connected an parallel to each other, and a drain-to-gate connected n-channel MOS transistor 2213 connected in series to the constant current source 2211 and the auxiliary constant current source 2212. The auxiliary constant current source 2212 is switched ON and OFF by the inverted feedback signal $OUT_-$, so that a node N8 between the constant current sources 2211 and 2212 and the drain-to-gate connected n-channel MOS transistor 2213 generates the bias voltage $V_{B1}$.

Similarly, the bias circuit 22-2 is constructed by a constant current source 2221 and an auxiliary constant current source 2222 connected an parallel to each other, and a drain-to-gate connected n-channel MOS transistor 2223 connected in series to the constant current source 2221 and the auxiliary constant current source 2222. The auxiliary constant current source 2222 is switched ON and OFF by the non-inverted feedback signal $OUT_+$, so that a node N9 between the constant current sources 2221 and 2222 and the drain-to-gate connected n-channel MOS transistor 2223 generates the bias voltage $V_{B2}$.

The operation of the receiver of the receiver-side integrated circuit unit 2 of FIG. 10 is explained next with reference to FIGS. 11A, 11B and 11C. Here, FIG. 11A shows a steady state where the input signal IN of the transmitter circuit 10 is high as shown in FIG. 3A, FIG. 11B shows a transient state where the input signal IN of the transmitter circuit 10 is switched from a high level as shown in FIG. 3A to a low level as shown in FIG. 3B, and FIG. 11C shows a steady state where the input signal IN of the transmitter circuit 10 is low as shown in FIG. 3B.

Figure 11A:
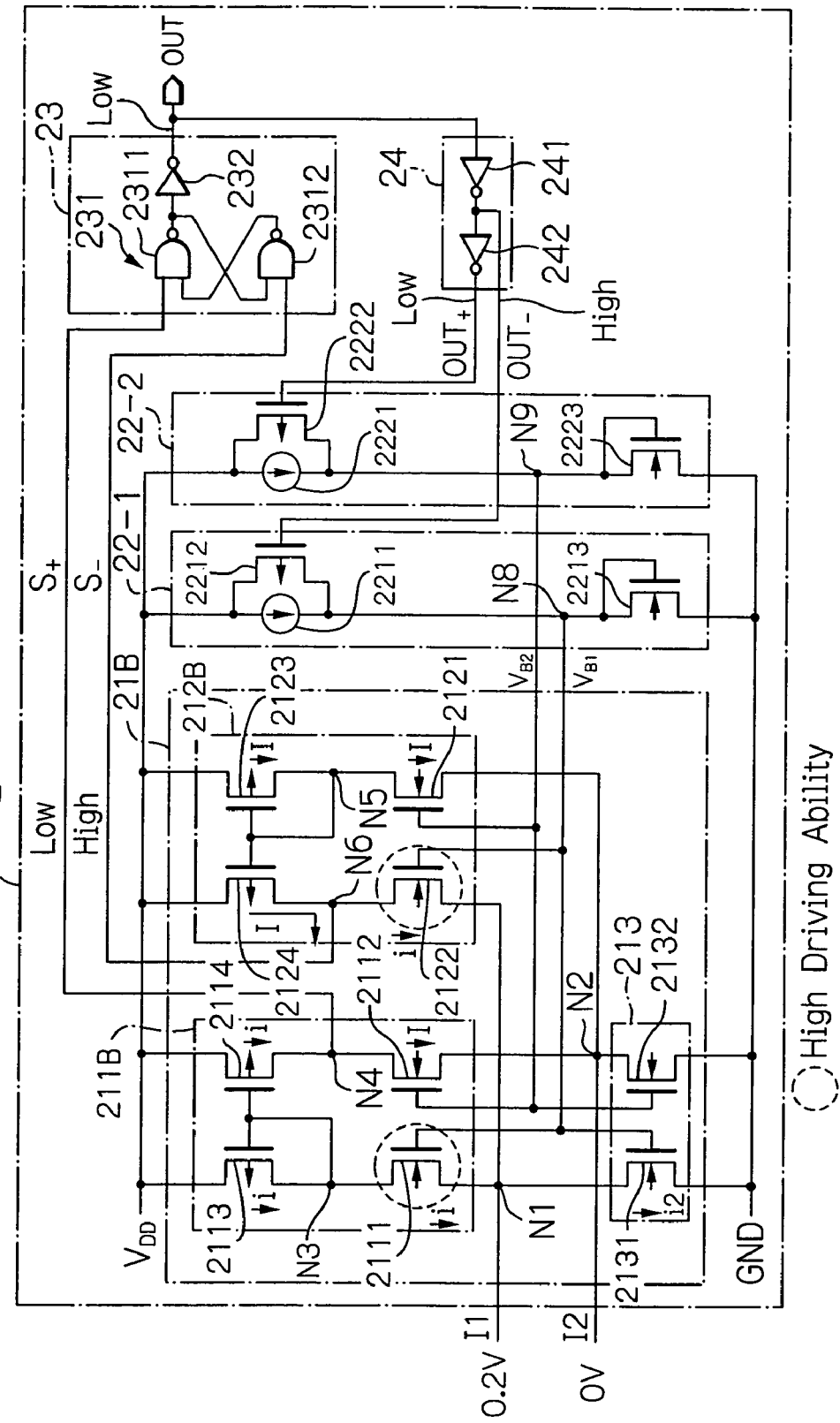
FIGS. 11A, 11B and 11C are circuit diagrams for explaining the operation of the receiver of FIG. 10.
Figure 11B:
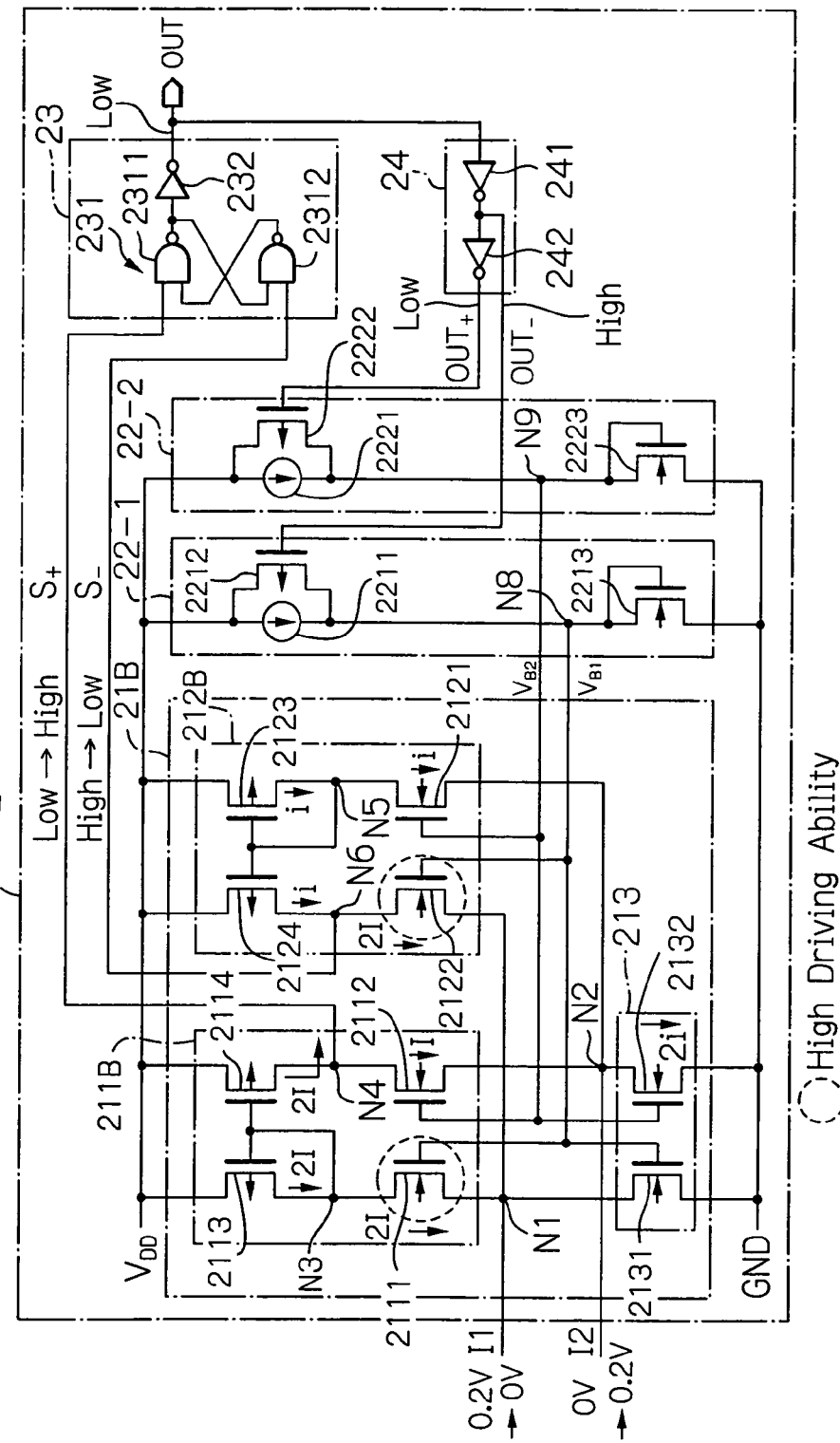
Figure 11C:
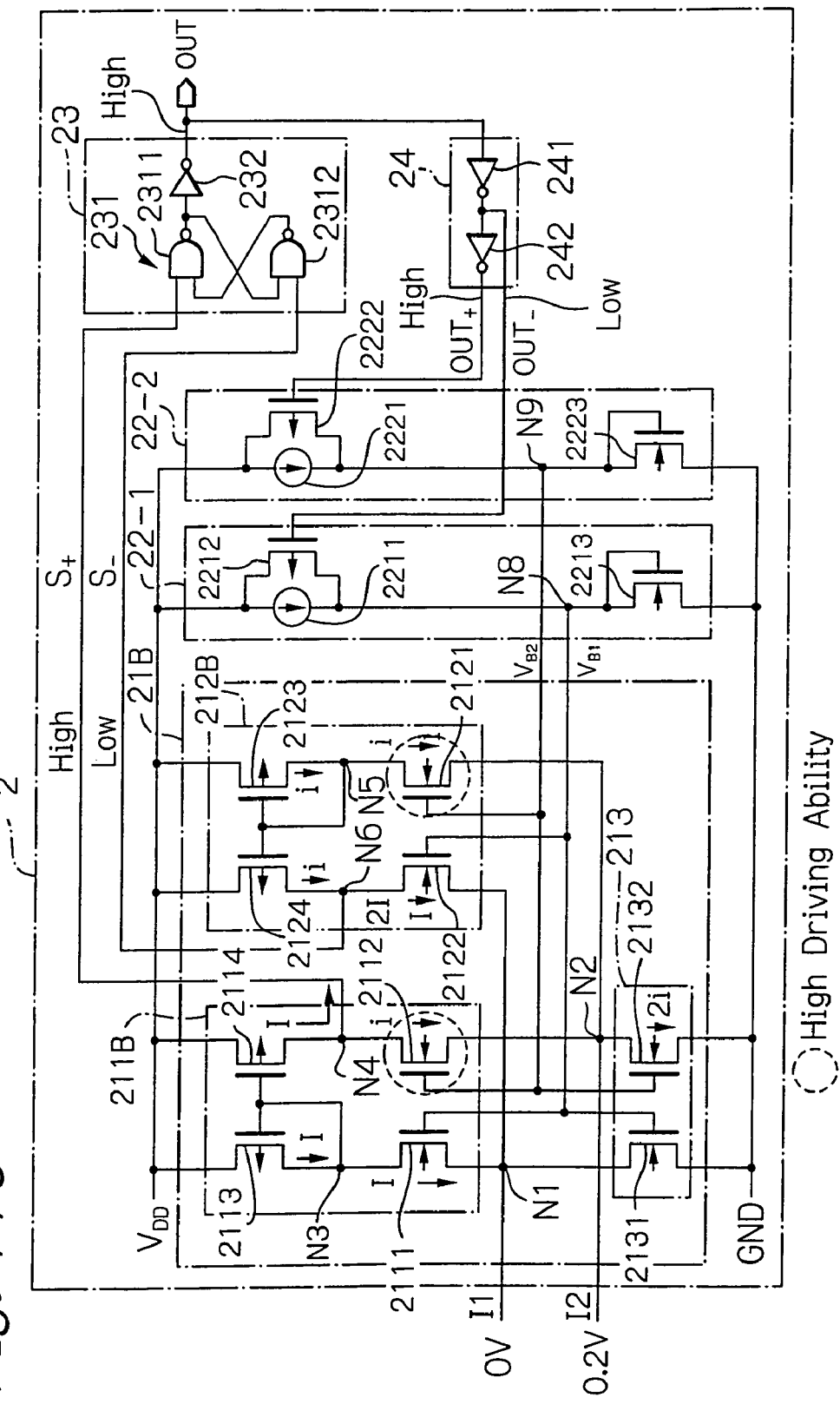

First, referring to FIG. 11A, in a first steady state of the transmitter circuit 10 where the input signal IN is high as shown in FIG. 3A, the transmission line 3-1 is in an HZ state and the transmission line 3-2 is at 0V, so that the voltages at the nodes N1 and N2 are about 0.2V and 0V, respectively. At this time, it will be determined that the non-inverted amplification signal $S_+$ is low and the inverted amplification signal $S_-$ is high, so that the output signal OUT is low. Therefore, the non-inverted feedback signal $OUT_+$ is low and the inverted feedback signal $OUT_-$ is high. As a result, in the bias circuit 22-1, the auxiliary constant current source 2212 is switched ON to increase the bias voltage $V_{B1}$, so that the n-channel MOS transistors 2111 and 2122 have a high driving ability. Also, in the bias circuit 22-2, the auxiliary constant current source 2222 is switched OFF not to increase the bias voltage $V_{B2}$, so that the n-channel MOS transistors 2112 and 2121 have a low driving ability.

Therefore, in the non-inverted amplification signal generating circuit 211B, the n-channel MOS transistor 2112 is deeply turned ON while the n-channel MOS transistor 2111 is shallowly turned ON. As a result, a relatively-small current represented by "i" flows through the n-channel MOS transistor 2111 as well as the p-channel MOS transistors 2113 and 2114 of the current mirror circuit. In this case, since a relatively-large current represented by "I" flows through only the n-channel MOS transistor 2112, a low level signal at the node N4 is supplied as the non-inverted amplification signal $S_+$ to the latch circuit 231 of the output circuit 23 due to the relatively-small current flowing through the p-channel MOS transistor 2114. In other words, such a low level signal is obtained by amplifying the very small difference (=0V–0.2V) between the voltages at the nodes N2 and N1. Also, in the inverted amplification signal generating circuit 212B, the n-channel MOS transistor 2121 is deeply turned ON while the n-channel MOS transistor 2122 is shallowly turned ON. As a result, a relatively-large current represented by "I" flows through the n-channel MOS transistor 2121 as well as the p-channel MOS transistors 2123 and 2124 of the current mirror circuit. In this case, since a relatively-small current represented by "i" flows through only the n-channel MOS transistor 2122, a high level signal at the node N6 is supplied as the inverted amplification signal $S_-$ to the latch circuit 232 of the output circuit 23 due to the relatively-large current flowing through the p-channel MOS transistor 2124. In other words, such a high level signal is obtained by amplifying the very small difference (=0.2V–0V) between the voltages at the nodes N1 and N2.

Note that, since the transmission line 3-1 is in an HZ state, the total relatively-small currents "2i" flowing through the n-channel MOS transistors 2111 and 2121 flow through the n-channel MOS transistor 2131 of the constant current source circuit 213.

Thus, in FIG. 11A, even when the two n-channel MOS transistors 2111 and 2122 have a substantially high driving ability, since these high driving ability transistors are shallowly turned ON, the power consumption is not so increased as compared with the receiver of FIG. 4.

Next, referring to FIG. 11B, in a transient state of the transmitter circuit 10 where the input signal IN is switched from high to low as shown in FIG. 3B, the transmission line 3-1 is at 0V and the transmission line 3-2 is in an HZ state, so that the voltages at the nodes N1 and N2 are about 0V and 0.2V, respectively. Even at this time, the non-inverted feedback signal $OUT_+$ is still low and the inverted feedback signal $OUT_-$ is still high. As a result, the n-channel MOS transistors 2111 and 2122 have a high driving ability, and the n-channel MOS transistors 2112 and 2121 have a low driving ability.

Therefore, in the non-inverted amplification signal generating circuit 211B, the n-channel MOS transistor 2111 is deeply turned ON while the n-channel MOS transistors 2112 is shallowly turned ON. As a result, a considerably-large current represented by "2I" flows through the n-channel MOS transistor 2111 as well as the p-channel MOS transistors 2113 and 2114 of the current mirror circuit. In this case, since a relatively-small current represented by "i" flows through only the n-channel MOS transistor 2112, the low level signal at the node N4 is rapidly switched to a high level signal, and this high level signal supplied as the non-inverted amplification signal $S_+$ to the latch circuit 231 of the output circuit 23 due to the relatively-small current flowing through the p-channel MOS transistor 2112. In other words, such a high level signal is obtained by rapidly amplifying the very small difference (=0V-0.2V) between the voltages at the nodes N2 and N1. Also, in the inverted amplification signal generating circuit 212A, the n-channel MOS transistor 2122 is deeply turned ON while the n-channel MOS transistor 2121 is shallowly turned ON. As a result, a relatively-small current represented by "i" flows through the n-channel MOS transistor 2121 as well as the p-channel MOS transistors 2123 and 2124 of the current mirror circuit. In this case, since a relatively-small current represented by "i" flows through the n-channel MOS transistor 2124, a high level signal at the node N6 is rapidly switched to a low level signal, and this low level signal is supplied as the inverted amplification signal $S_-$ to the latch circuit 232 of the output circuit 23 due to the relatively-small current flowing through the p-channel MOS transistor 2124. In other words, such a low level signal is obtained by rapidly amplifying the very small difference (=0.2V–0V) between the voltages at the nodes N1 and N2.

Note that, since the transmission line 3-2 is in an HZ state, the total relatively-small currents "2i" flowing through the n-channel MOS transistors 2112 and 2121 flow through the n-channel MOS transistor 2132 of the constant current source circuit 213.

Thus, in FIG. 11B, the two n-channel MOS transistors 2111 and 2122 have a substantially high driving ability, and also, these high driving ability transistors are deeply turned ON. As a result, although the power consumption is considerably increased as compared with the receiver of FIG. 4, the non-inverted amplification signal $S_+$ and the inverted amplification signal $S_-$ can be rapidly switched to obtain a high speed operation.

Finally, referring to FIG. 11C, in a second steady state of the transmitter circuit 10 where the input signal IN is low as shown in FIG. 3B, the transmission line 3-1 is at 0V and the transmission line 3-2 is in an HZ state, so that the voltages at the nodes N1 and N2 are about 0V and 0.2V, respectively. At this time, the non-inverted amplification signal $S_+$ is high and the inverted amplification signal $S_-$ is low, so that the output signal OUT is high. Therefore, the non-inverted feedback signal $OUT_+$ is high and the inverted feedback signal $OUT_-$ is low. As a result, in the bias circuit 22-1, the auxiliary constant current source 2212 is switched OFF to increase the bias voltage $V_{B1}$, so that the n-channel MOS transistors 2111 and 2122 have a low driving ability. Also, in the bias circuit 22-2, the auxiliary constant current source 2222 is switched ON not to increase the bias voltage $V_{B2}$, so that the n-channel MOS transistors 2112 and 2121 have a high driving ability.

Therefore, in the non-inverted amplification signal generating circuit 211B, the n-channel MOS transistor 2111 is deeply turned ON while the n-channel MOS transistors 2112 is shallowly turned ON. As a result, a relatively-large current represented by "I" flows through the n-channel MOS transistor 2111 as well as the p-channel MOS transistors 2113 and 2114 of the current mirror circuit. In this case, since a relatively-small current represented by "i" flows through only the n-channel MOS transistor 2112, a high level signal at the node N4 is supplied as the non-inverted amplification signal $S_+$ to the latch circuit 231 of the output circuit 23 due to the relatively-large current flowing through the p-channel MOS transistor 2114. In other words, such a high level signal is obtained by amplifying the very small difference (=0.2V–0V) between the voltages at the nodes N2 and N1. Also, in the inverted amplification signal generating circuit 212B, the n-channel MOS transistor 2122 is deeply turned ON while the n-channel MOS transistor 2121 is shallowly turned ON. As a result, a relatively-small current represented by "i" flows through the n-channel MOS transistor 2121 as well as the p-channel MOS transistor 2123 and 2124 of the current mirror circuit. In this case, since a relatively-large current represented by "I" flows through only the n-channel MOS transistor 2122, a low level signal at the node N6 is supplied as the inverted amplification signal $S_-$ to the latch circuit 232 of the output circuit 23 due to the relatively-small current flowing through the p-channel MOS transistor 2124. In other words, such a low level signal is obtained by amplifying the very small difference (=0V–0.2V) between the voltages at the nodes N1 and N2.

Note that, since the transmission line 3-2 is in an HZ state, the total relatively-small currents "$2i$" flowing through the n-channel MOS transistors 2112 and 2121 flow through the n-channel MOS transistor 2132 of the constant current source circuit 213.

Thus, in FIG. 11C, even when the two n-channel MOS transistors 2112 and 2121 have a substantially high driving ability, since these high driving ability amplifiers are shallowly turned ON, the power consumption is not so increased as compared with the receiver of FIG. 4.

Thus, in the second embodiment, the receiver can operate at a high speed. Even in this case, although the power consumption is considerably increased only in a transient state, the increase of the power consumption in a steady state can be suppressed so that the increase of the entire power consumption can be suppressed.

Figure 12A:
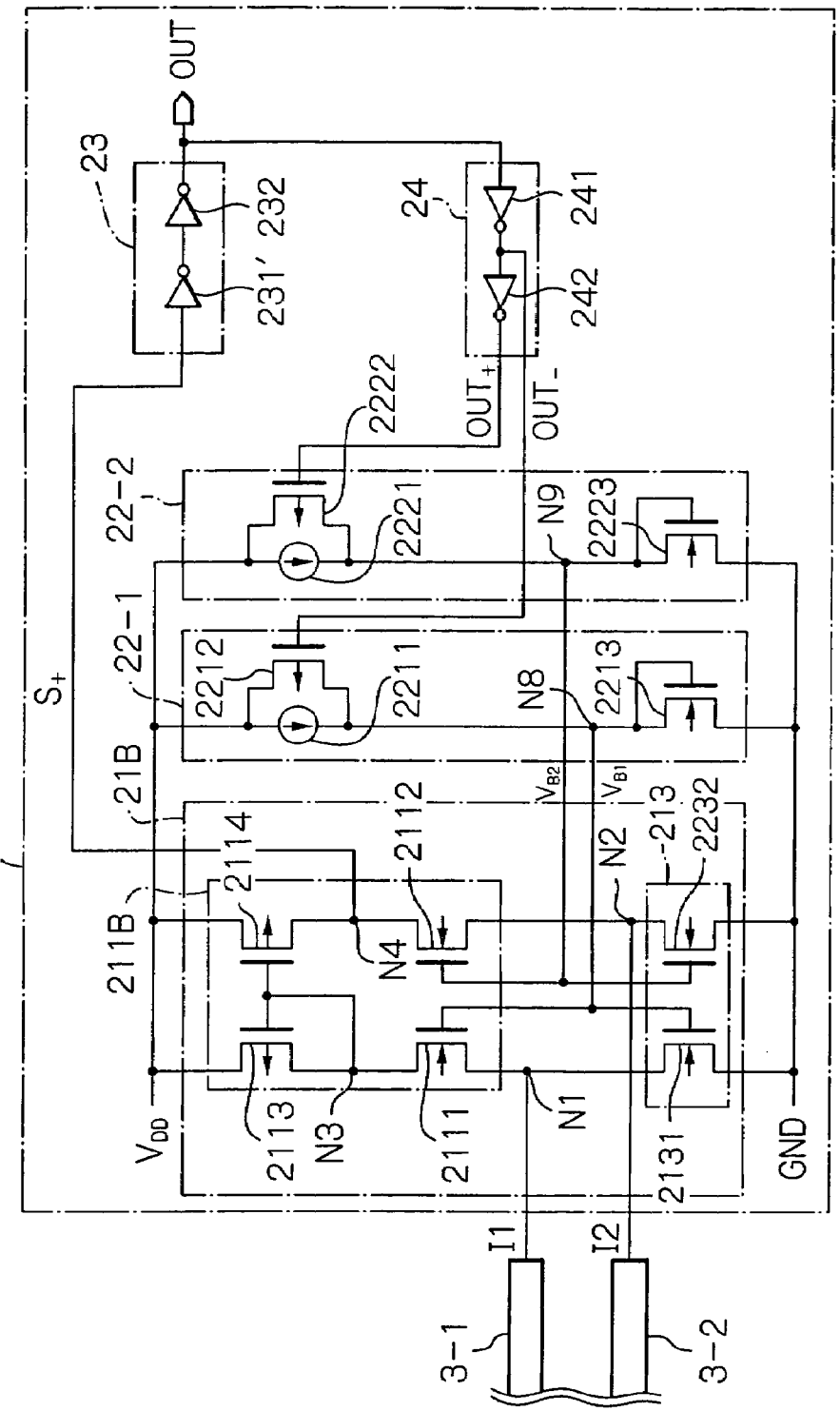
FIGS. 12A and 12B are circuit diagrams illustrating modifications of the receiver of FIG. 10.

As illustrated in FIG. 12A, one of the non-inverted amplification signal generating circuit 211B and the inverted amplification signal generating circuit 212B can be omitted. For example, the inverted amplification signal generated circuit 212B of FIG. 6 is omitted. In this case, the output circuit 23 is constructed by an inverter 231' instead of the latch circuit 231 of FIG. 6. Also, the output circuit 23 can be combined with the feedback signal generating circuit 24. Note that, if the non-inverted amplification signal generating circuit 211A of FIG. 6 is omitted, the inverter 231 is also omitted.

Figure 12B:
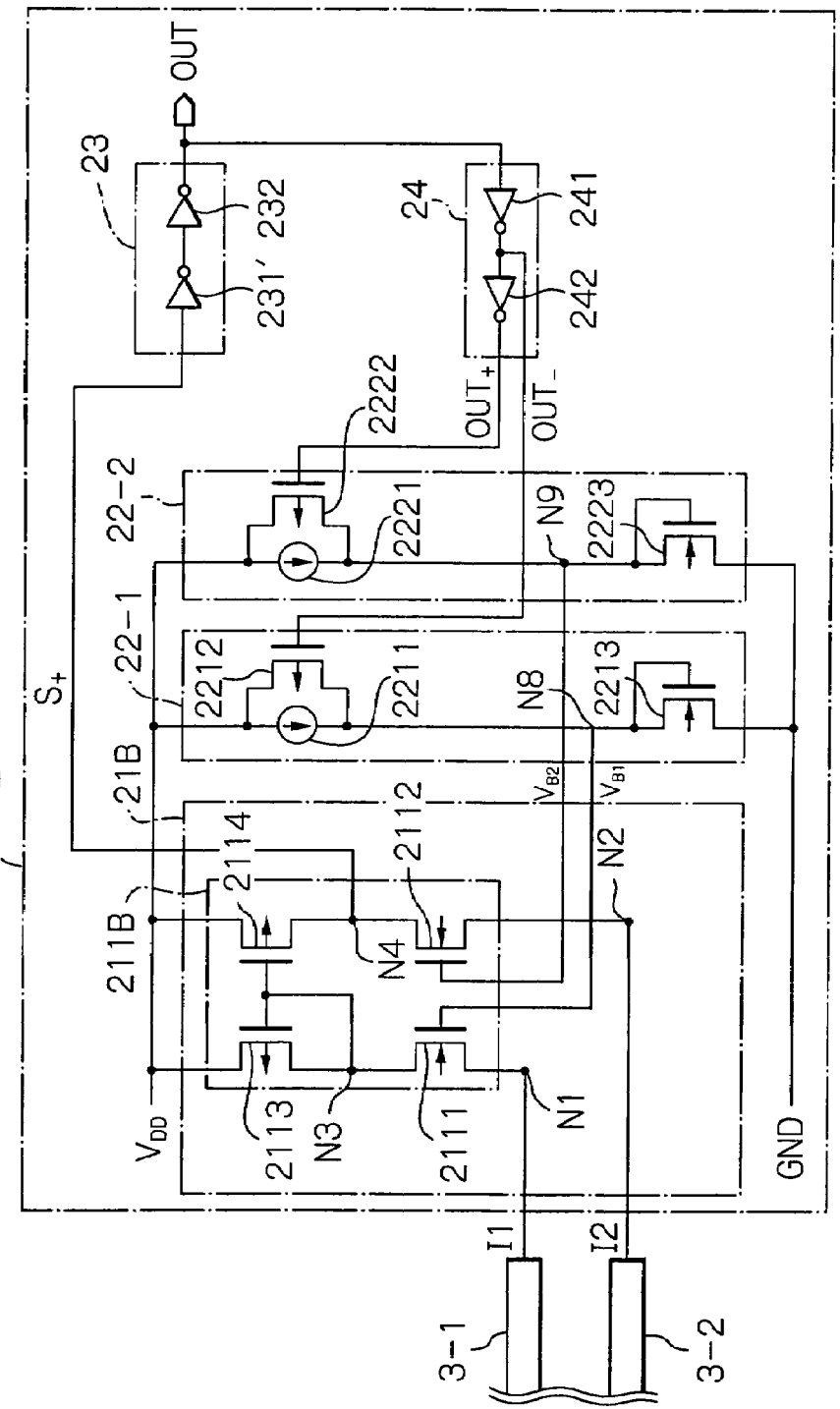

Also, as illustrated in FIG. 12B, the constant current source circuit 213 can be omitted. In this case, there is no relatively-small current flowing through the n-channel MOS transistors 2111 and 2112 if they are connected to an HZ state transmission line. That is, the constant current source circuit 213 is not indispensable.

The invention claimed is:

1. A receiver comprising:
a first transmission line providing a first input signal;
a second transmission line providing a second input signal;
a signal reception circuit connected to the first transmission line and the second transmission line, said signal reception circuit including a first amplifier section configured to generate a first current in response to the first input signal and a second amplifier section configured to generate a second current in response to the second input signal, to thereby generate an amplification signal in accordance with a difference between said first and second currents; and
a feedback signal generating circuit connected to said signal reception circuit and configured to generate a feedback signal in accordance with said amplification signal,
driving abilities of said first and second amplifier sections being determined in accordance with said feedback signal,
wherein said amplification signal is formed by a non-inverted amplification signal and an inverted amplification signal, so that said signal reception circuit comprises a non-inverted amplification signal generating circuit and an inverted amplification signal generating circuit, said first current being formed by a first non-inverted-side current and a first inverted-side current, said second current being formed by a second non-inverted-side current and a second inverted-side current,
said non-inverted amplification signal generating circuit comprising:
a first non-inverted-side current generating section as said first amplifier section adapted to generate said first non-inverted-side current in response to said first input signal; and
a second non-inverted-side current generating section as said second amplifier section adapted to generate said second non-inverted-side current in response to said second input signal;
said non-inverted amplification signal being generated in accordance with a difference between said first and second non-inverted-side currents,
driving abilities of said first and second non-inverted-side current generating circuits being determined in accordance with said feedback signal,
said inverted amplification signal generating circuit comprising:
a first inverted-side current generating section as said second amplifier section adapted to generate said first inverted-side current in response to said second input signal; and
a second inverted-side current generating section as said first amplifier section adapted to generate said second inverted-side current in response to said first input signal;
said inverted amplification signal being generated in accordance with a difference between said first and second inverted-side currents,
driving abilities of said first and second inverted-side current generating circuits being determined in accordance with said feedback signal.

2. The receiver as set forth in claim 1, further comprising:
an output circuit including a latch circuit adapted to receive said non-inverted amplification signal and said inverted amplification signal to generate an output signal,
said feedback signal generating circuit being configured to receive said output signal to generate a non-inverted feedback signal and an inverted feedback signal as said feedback signal,
the driving abilities of said first non-inverted-side current generating section and said second inverted-side current generating section being determined in accordance with one of said non-inverted feedback signal and said inverted feedback signal,
the driving abilities of said second non-inverted-side current generating section and said first inverted-side current generating section being determined in accordance with the other of said non-inverted feedback signal and said inverted feedback signal.

3. The receiver as set forth in claim 2, wherein said non-inverted amplification signal generating circuit further comprises a first current mirror circuit with a first reference current input node connected to said first non-inverted-side current generating section and a first mirror current output node connected to second non-inverted-side current generating section, and wherein said inverted amplification signal generating circuit further comprises a second current mirror circuit with a second reference current input node connected to said second inverted-side current generating section and a second mirror current output node connected to said first inverted-side current generating section.

4. The receiver as set forth in claim 3, wherein said first non-inverted-side current generating section comprises:
a first MOS transistor connected between the first reference current input node of said first current mirror circuit and a first input signal receiving node for receiving said first input signal; and
a series of a first auxiliary MOS transistor and a first switch connected between the first reference current input node of said first current mirror circuit and said first input signal receiving node,
said second non-inverted-side current generating section comprising:
a second MOS transistor connected between the first mirror current output node of said first current mirror circuit and a second input signal receiving node for receiving said second input signal; and
a series of a second auxiliary MOS transistor and a second switch connected between the first mirror current output node of said first current mirror circuit and said second input signal receiving node,
said first inverted-side current generating section comprising:
a third MOS transistor connected between the second reference current input node of said second current mirror circuit and said second input signal receiving node; and
a series of a third auxiliary MOS transistor and a third switch connected between the second reference current input node of said second current mirror circuit and said second input signal receiving node,
said second inverted-side current generating section comprising:
a fourth MOS transistor connected between the second mirror current output node of said second current mirror circuit and said first input signal receiving node; and
a series of a fourth auxiliary MOS transistor and a fourth switch connected between the second mirror current output node of said second current mirror circuit and said first input signal receiving node,
a bias voltage being applied to gates of said first, second, third and fourth MOS transistors and said first, second, third and fourth auxiliary MOS transistors,
said first and fourth switches being switched ON and OFF in accordance with the one of said non-inverted feedback signal and said inverted feedback signal,
said second and third switches being switched ON and OFF in accordance with the other of said non-inverted feedback signal and said inverted feedback signal.

5. The receiver as set forth in claim 2, wherein said non-inverted amplification signal generating circuit further comprises a first current mirror circuit with a first reference current input node connected to said first non-inverted-side current generating section and a first mirror current output node connected to said second non-inverted-side current generating section, and wherein said inverted amplification signal generating circuit further comprises a second current mirror circuit with a second reference current input node connected to said second inverted-side current generating section and a second mirror current output node connected to said first inverted-side current generating section,
said first non-inverted-side current generating section comprising a first MOS transistor connected between the first reference current input node of said first current mirror circuit and a first input signal receiving node for receiving said first input signal,
said second non-inverted-side current generating section comprising a second MOS transistor connected between the first mirror current output node of said first current mirror circuit and a second input signal receiving node for receiving said second input signal,
said first inverted-side current generating section comprising a third MOS transistor connected between the second reference current input node of said second current mirror circuit and said second input signal receiving node,
said second inverted-side current generating section comprising a fourth MOS transistor connected between the second mirror current output node of said second current mirror circuit and said first input signal receiving node; and
a first bias voltage being applied to gates of said first and fourth MOS transistors, and a second bias voltage being applied to said second and third MOS transistors.

6. The receiver as set forth in claim 5, further comprising:
a first bias circuit adapted to receive the one of said non-inverted feedback signal and said inverted feedback signal to generate said first bias voltage;
a second bias circuit adapted to receive the other of said non-inverted feedback signal and said inverted feedback signal to generate said second bias voltage,
said first bias circuit comprising:
a first constant current source;
a first drain-to-gate connected MOS transistor connected in series to said first constant current source; and
a first switch connected in parallel to said first constant current source and being activated by the one of said non-inverted feedback signal and said inverted feedback signal,
said second bias circuit comprising:
a second constant current source;
a second drain-to-gate connected MOS transistor connected in series to said second constant current source; and
a second switch connected in parallel to said second constant current source and being activated by the other of said non-inverted feedback signal and said inverted feedback signal.

7. A receiver comprising:
a first transmission line providing a first input signal;
a second transmission line providing a second input signal;
a signal reception circuit connected to the first transmission line and the second transmission line, said signal reception circuit including a first amplifier section configured to generate a first current in response to the first input signal and a second amplifier section configured to generate a second current in response to the second input signal, to thereby generate an amplification signal in accordance with a difference between said first and second currents; and a feedback signal generating circuit connected to said signal reception circuit and configured to generate a feedback signal in accordance with said amplification signal, driving abilities of said first and second amplifier sections being determined in accordance with said feedback signal, wherein said amplification signal is formed by a non-inverted amplification signal, so that said signal reception circuit comprises a non-inverted amplification signal generating circuit, said first current being formed by a first non-inverted-side current, said second current being formed by a second non-inverted-side current, said non-inverted amplification signal generating circuit comprising:

a first non-inverted-side current generating section as said first amplifier section adapted to generate said first non-inverted-side current in response to said first input signal; and a second non-inverted-side current generating section as said second amplifier section adapted to generate said second non-inverted-side current in response to said second input signal;

said non-inverted amplification signal being generated in accordance with a difference between said first and second non-inverted-side currents, driving abilities of said first and second non-inverted-side current generating circuits being determined in accordance with said feedback signal.

8. The receiver as set forth in claim 7, further comprising:

an output circuit adapted to receive said non-inverted amplification signal to generate an output signal, said feedback signal generating circuit being configured to receive said output signal to generate a non-inverted feedback signal and an inverted feedback signal as said feedback signal, the driving ability of said first non-inverted-side current generating section being determined in accordance with one of said non-inverted feedback signal and said inverted feedback signal, the driving ability of said second non-inverted-side current generating section being determined in accordance with the other of said non-inverted feedback signal and said inverted feedback signal.

9. The receiver as set forth in claim 8, wherein said non-inverted amplification signal generating circuit further comprises a current mirror circuit with a reference current input node connected to said first non-inverted-side current generating section and a mirror current output node connected to said second non-inverted-side current generating section.

10. The receiver as set forth in claim 9, wherein said first non-inverted-side current generating section comprises:

a first MOS transistor connected between the reference current input node of said current mirror circuit and a first input signal receiving node for receiving said first input signal; and a series of a first auxiliary MOS transistor and a first switch connected between the reference current input node of said current mirror circuit and said first input signal node, said second non-inverted-side current generating section comprising:

a second MOS transistor connected between the mirror current output node of said current mirror circuit and a second input signal receiving node for receiving said second input signal; and a series of a second auxiliary MOS transistor and a second switch connected between the mirror current output node of said current mirror circuit and said second input signal receiving node, a bias voltage being applied to gates of said first and second MOS transistors and said first and second auxiliary MOS transistors, said first switch being switched ON and OFF in accordance with the one of said non-inverted feedback signal and said inverted feedback signal, said second switch being switched ON and OFF in accordance with the other of said non-inverted feedback signal and said inverted feedback signal.

11. A receiver comprising:

a first transmission line providing a first input signal;

a second transmission line providing a second input signal;

a signal reception circuit connected to the first transmission line and the second transmission line, said signal reception circuit including a first amplifier section configured to generate a first current in response to the first input signal and a second amplifier section configured to generate a second current in response to the second input signal, to thereby generate an amplification signal in accordance with a difference between said first and second currents; and a feedback signal generating circuit connected to said signal reception circuit and configured to generate a feedback signal in accordance with said amplification signal, driving abilities of said first and second amplifier sections being determined in accordance with said feedback signal, wherein said amplification signal is formed by an inverted amplification signal, so that said signal reception circuit comprises an inverted amplification signal generating circuit, said first current being formed by a first inverted-side current, said second current being formed by a second inverted-side current, said inverted amplification signal generating circuit comprising:

a first inverted-side current generating section as said second amplifier section adapted to generate said first inverted-side current in response to said second input signal; and a second non-inverted-side current generating section as said first amplifier section adapted to generate said second inverted-side current in response to said first input signal;

said inverted amplification signal being generated in accordance with a difference between said first and second inverted-side currents, driving abilities of said first and second inverted-side current generating circuits being determined in accordance with said feedback signal.

12. The receiver as set forth in claim 11, further comprising:

an output circuit adapted to receive said inverted amplification signal to generate an output signal, said feedback signal generating circuit being configured to receive said output signal to generate a non-inverted feedback signal and an inverted feedback signal as said feedback signal, the driving ability of said first inverted-side current generating section being determined in accordance with one of said non-inverted feedback signal and said inverted feedback signal, the driving ability of said second non-inverted-side current generating section being determined in accordance with the other of said non-inverted feedback signal and said inverted feedback signal.

13. The receiver as set forth in claim 12, wherein said inverted amplification signal generating circuit further comprises a current mirror circuit with a reference current input node connected to said first inverted-side current generating section and a mirror current output node connected to said second inverted-side current generating section.

14. The receiver as set forth in claim 13, wherein said first inverted-side current generating section comprises:

a first MOS transistor connected between the reference current input node of said current mirror circuit and a second input signal receiving node for receiving said second input signal; and a series of a first auxiliary MOS transistor and a first switch connected between the reference current input node of said current mirror circuit and said second input signal node, said second inverted-side current generating section comprising:

a second MOS transistor connected between the mirror current output node of said current mirror circuit and a first input signal receiving node for receiving said first input signal; and a series of a second auxiliary MOS transistor and a second switch connected between the mirror current output node of said current mirror circuit and said first input signal node, a bias voltage being applied to gates of said first and second MOS transistors and said first and second auxiliary MOS transistors, said first switch being switched ON and OFF in accordance with the one of said non-inverted feedback signal and said inverted feedback signal, said second switch being switched ON and OFF in accordance with the other of said non-inverted feedback signal and said inverted feedback signal.

15. A receiver comprising:

a first transmission line providing a first input signal;

a second transmission line providing a second input signal;

a signal reception circuit connected to the first transmission line and the second transmission line, said signal reception circuit including a first amplifier section configured to generate a first current in response to the first input signal and a second amplifier section configured to generate a second current in response to the second input signal, to thereby generate an amplification signal in accordance with a difference between said first and second currents; and a feedback signal generating circuit connected to said signal reception circuit and configured to generate a feedback signal in accordance with said amplification signal, driving abilities of said first and second amplifier sections being determined in accordance with said feedback signal, wherein said amplification signal is formed by a non-inverted amplification signal, so that said signal reception circuit comprises a non-inverted amplification signal generating circuit, said first current being formed by a first non-inverted-side current, said second current being formed by a second non-inverted-side current, wherein said non-inverted amplification signal generating circuit further comprises a current mirror circuit with a reference current input node connected to said first non-inverted-side current generating section and a mirror current output node connected to said second non-inverted-side current generating section, said first non-inverted-side current generating section comprising a first MOS transistor connected between the reference current input node of said current mirror circuit and a first input signal receiving node for receiving said first input signal, said second non-inverted-side current generating section comprising a second MOS transistor connected between the mirror current output node of said current mirror circuit and a second input signal receiving node for receiving said second input signal, a first bias voltage being applied to a gate of said first MOS transistor, and a second bias voltage being applied to said second MOS transistor.

16. The receiver as set forth in claim 15, further comprising:

a first bias circuit adapted to receive the one of said non-inverted feedback signal and said inverted feedback signal to generate said first bias voltage;

a second bias circuit adapted to receive the other of said non-inverted feedback signal and said inverted feedback signal to generate said second bias voltage, said first bias circuit comprising:

a first constant current source;

a first drain-to-gate connected MOS transistor connected in series to said first constant current source; and a first switch connected in parallel to said first constant current source and being activated by the one of said non-inverted feedback signal and said inverted feedback signal, said second bias circuit comprising:

a second constant current source;

a second drain-to-gate connected MOS transistor connected in series to said second constant current source; and a second switch connected in parallel to said second constant current source and being activated by the other of said non-inverted feedback signal and said inverted feedback signal.

17. A receiver comprising:

a first transmission line providing a first input signal;

a second transmission line providing a second input signal;

a signal reception circuit connected to the first transmission line and the second transmission line, said signal reception circuit including a first amplifier section configured to generate a first current in response to the first input signal and a second amplifier section configured to generate a second current in response to the second input signal, to thereby generate an amplification signal in accordance with a difference between said first and second currents; and a feedback signal generating circuit connected to said signal reception circuit and configured to generate a feedback signal in accordance with said amplification signal, driving abilities of said first and second amplifier sections being determined in accordance with said feedback signal, wherein said amplification signal is formed by an inverted amplification signal, so that said signal reception circuit comprises an inverted amplification signal generating circuit, said first current being formed by a first inverted-side current, said second current being formed by a second inverted-side current, wherein said inverted amplification signal generating circuit further comprises a current mirror circuit with a reference current input node connected to said first inverted-side current generating section and a mirror current output node connected to said second inverted-side current generating section, said first inverted-side current generating section comprising a first MOS transistor connected between the reference current input node of said current mirror circuit and a second input signal receiving node for receiving said second input signal, said second inverted-side current generating section comprising a second MOS transistor connected between the mirror current output node of said current mirror circuit and a first input signal receiving node for receiving said first input signal, a first bias voltage being applied to a gate of said second MOS transistor, and a second bias voltage being applied to said first MOS transistor.

18. The receiver as set forth in claim 17, further comprising:

a first bias circuit adapted to receive the one of said non-inverted feedback signal and said inverted feedback signal to generate said first bias voltage;

a second bias circuit adapted to receive the other of said non-inverted feedback signal and said inverted feedback signal to generate said second bias voltage, said first bias circuit comprising:

a first constant current source;

a first drain-to-gate connected MOS transistor connected in series to said first constant current source; and a first switch connected in parallel to said first constant current source and being activated by the one of said non-inverted feedback signal and said inverted feedback signal, said second bias circuit comprising:

a second constant current source;

a second drain-to-gate connected MOS transistor connected in series to said second constant current source; and a second switch connected in parallel to said second constant current source and being activated by the other of said non-inverted feedback signal and said inverted feedback signal.

19. A method for operating a receiver including a first amplifier section adapted to generate a first current in response to a first input signal and a second amplifier section adapted to generate a second current in response to a second input signal, said first input signal and said second input signal originating from a source external to the receiver, comprising:

receiving said first second input signals from the external source;

generating an amplification signal in accordance with a difference between said first and second currents;

generating a feedback signal in accordance with said amplification; and determining driving abilities of said first and second amplifier sections in accordance with said feedback signal, wherein said amplification signal is formed by a non-inverted amplification signal and an inverted amplification signal, said amplification signal generating comprising:

generating a first non-inverted-side current in response to said first input signal;

generating a second non-inverted-side current in response to said second input signal;

generating said non-inverted amplification signal in accordance with a difference between said first and second non-inverted-side currents;

generating a first inverted-side current in response to said second input signal;

generating a second inverted-side current in response to said first input signal; and generating said inverted amplification signal in accordance with a difference between said first and second inverted-side currents, said driving ability determining comprising:

determining driving abilities of generating said first and second non-inverted-side currents in accordance with said feedback signal; and determining driving abilities of generating said first and second inverted-side currents in accordance with said feedback signal.

20. The method as set forth in claim 19, wherein said amplification signal generating further comprising:

generating a latch output signal in accordance with said non-inverted amplification signal and said inverted amplification signal; and generating a non-inverted feedback signal and an inverted feedback signal in accordance with said latch output signal, and said driving ability determining comprising:

making the driving ability of generating said first non-inverted-side current and the driving ability of generating said second non-inverted-side current different from each other in accordance with said non-inverted feedback signal and said inverted feedback signal; and making the driving ability of generating said first inverted-side current and the driving ability of generating said second inverted-side current different from each other in accordance with said non-inverted feedback signal and said inverted feedback signal.

* * * * *